(12) United States Patent
Nishimura et al.

(10) Patent No.: US 7,216,010 B2
(45) Date of Patent: May 8, 2007

(54) ARTICLE MANUFACTURING APPARATUS

(75) Inventors: Ryoji Nishimura, Ritto (JP); Yukari Uchida, Ritto (JP); Hiroe Konishi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/476,759

(22) PCT Filed: Apr. 7, 2003

(86) PCT No.: PCT/JP03/04415

§ 371 (c)(1),
(2), (4) Date: Nov. 5, 2003

(87) PCT Pub. No.: WO03/091812

PCT Pub. Date: Nov. 6, 2003

(65) Prior Publication Data

US 2004/0135783 A1    Jul. 15, 2004

(30) Foreign Application Priority Data

Apr. 24, 2002  (JP) .............................. 2002-121695

(51) Int. Cl.
*G06F 19/00* (2006.01)
(52) U.S. Cl. ...................... 700/180; 700/264; 345/173; 434/369
(58) Field of Classification Search ................ 700/180, 700/183, 184, 185, 95, 96, 264; 434/369; 345/418, 467
See application file for complete search history.

(56) References Cited

U.S. PATENT DOCUMENTS

| | | | |
|---|---|---|---|
| 4,844,190 A * | 7/1989 | Mikami et al. ........... 177/25.18 |
| 5,274,750 A * | 12/1993 | Shiina et al. ............... 700/264 |
| 6,290,571 B1 | 9/2001 | Dilger et al. | |
| 6,765,557 B1 * | 7/2004 | Segal et al. ................. 345/173 |
| 6,996,533 B2 * | 2/2006 | Ikeda et al. .............. 704/270.1 |

FOREIGN PATENT DOCUMENTS

| | | |
|---|---|---|
| JP | 1-131904 A | 5/1989 |
| JP | 2-140866 A | 5/1990 |
| JP | 5-127727 A | 5/1993 |
| JP | 6-250730 A | 9/1994 |
| JP | 8-16018 A | 6/1996 |
| JP | 10-180664 A | 7/1998 |
| JP | 2001-105359 A | 4/2001 |
| WO | WO 94/14109 A | 6/1994 |

* cited by examiner

*Primary Examiner*—Leo Picard
*Assistant Examiner*—Sheela S. Rao
(74) *Attorney, Agent, or Firm*—Shinjyu Global IP

(57) ABSTRACT

The present invention provides an article manufacturing apparatus that even a user unfamiliar with the article manufacturing apparatus can operate appropriately. The article manufacturing apparatus is a combinational weighing apparatus (1) arranged in an article manufacturing line, and is provided with a touch screen (70). The touch screen (70) displays operation screens that indicate the operation details to be performed by the combinational weighing apparatus (1), and guidance screens that provide procedural guidance on the operation details. In addition, the touch screen (70) inputs the operation details.

7 Claims, 23 Drawing Sheets

ARTICLE MANUFACTURING APPARATUS

FIELD OF THE INVENTION

The present invention relates to an article manufacturing apparatus installed in an article manufacturing line.

RELATED ART

Various article manufacturing apparatuses are installed and in use on article manufacturing lines for industrial products, food products, and the like. For example, weighing apparatuses for weighing articles, packaging apparatuses for packaging articles, and case packers for boxing finished articles are installed and in use on article manufacturing lines.

These article manufacturing apparatuses are often provided with a display unit that displays an operation screen, and an operation unit that inputs operation details. Further, the operation screen displays the operation details to be performed by the article manufacturing apparatus. For example, in the abovementioned weighing apparatus, the operation screen displays the start display for starting the weighing operation, and the setting display, such as for zero adjustment, weighing range, and weighing speed in the section for executing the weighing operation, and the like. The instruction manual of the article manufacturing apparatus generally provides an explanation of the operation details, and a user who operates the article manufacturing apparatus inputs the operation details of the article manufacturing apparatus while referencing the instruction manual.

In addition, it's often the case that the display unit displays a plan view of the article manufacturing apparatus in operation. This type of view makes it easy for the user to understand the operation details, and also makes it easier to operate the article manufacturing apparatus.

However, there are cases where the user is not familiar with the operation details of the article manufacturing apparatus, and does not perform correct operation of the apparatus. In particular, it is conceivable that a user unfamiliar with the operation of the article manufacturing apparatus might unfortunately operate the article manufacturing apparatus without having performed operations necessary to appropriately operate the article manufacturing apparatus. In such a case, it would be difficult to appropriately operate the article manufacturing apparatus. In light of the above example, there is a risk that the user could unfortunately start the weighing operation abruptly without zero adjusting the weighing apparatus, resulting in inaccurate weighing.

In addition, even in cases where the display unit displays a plan view of the article manufacturing apparatus, the configuration and actions of the article manufacturing apparatus are often complex, and cannot be adequately represented in a plan view. In such cases, the user may not necessarily be able to easily understand the operation details, and there is a risk that operation will also be difficult to perform.

DISCLOSURE OF THE INVENTION

The object of the present invention is to provide an article manufacturing apparatus that even a user unfamiliar with the article manufacturing apparatus can operate appropriately.

The article manufacturing apparatus as recited in the first aspect of the present invention is an article manufacturing apparatus disposed in an article manufacturing line, comprising a display unit and an operation unit. The display unit displays an operation screen indicating the details of the operation to be performed by the article manufacturing apparatus, and a guidance screen that provides procedural guidance on the operation details. The operation unit inputs the operation details. Furthermore, it is acceptable to provide the present article manufacturing apparatus with a so-called touch screen type display unit, wherein the display unit functions in parallel as the operation unit.

In the present article manufacturing apparatus, the display unit displays a guidance screen that provides procedural guidance on the operation details of the article manufacturing apparatus. Consequently, the user of the article manufacturing apparatus should input the operation details in accordance with the guidance of the guidance screen. Thereby, even an inexperienced user can appropriately operate the article manufacturing apparatus. Furthermore, the present invention is particularly effective because, for an article manufacturing apparatus disposed in an article manufacturing line, operations performed are often comparatively complex, and the operation details to be input also often become complex.

The article manufacturing apparatus as recited in the second aspect of the present invention is the article manufacturing apparatus as recited in the first aspect, wherein the display unit three-dimensionally displays the article manufacturing apparatus in the operation screen or the guidance screen.

In the present article manufacturing apparatus, the display unit three-dimensionally displays the article manufacturing apparatus in the operation screen or the guidance screen. An article manufacturing apparatus often entails three-dimensional operation. Therefore, it would be easier to understand the operation details if the configuration of the article manufacturing apparatus could be outlined three-dimensionally. Accordingly, in the present article manufacturing apparatus, the user can more easily understand the operation details of the article manufacturing apparatus. Thereby, even a user unfamiliar with the present article manufacturing apparatus can appropriately operate the article manufacturing apparatus.

The article manufacturing apparatus as recited in the third aspect of the present invention is the article manufacturing apparatus as recited in the first or second aspect, wherein the display unit displays an animation of the operation of the article manufacturing apparatus in the operation screen or the guidance screen.

In the present article manufacturing apparatus, the display unit displays an animation of the operation of the article manufacturing apparatus in the operation screen or the guidance screen. Consequently, the user can easily understand the operation of the article manufacturing apparatus. Thereby, in the present article manufacturing apparatus, even a user unfamiliar with the article manufacturing apparatus can appropriately operate the apparatus. In particular, because comparatively complex operations are often performed with an article manufacturing apparatus, the display of an animation is effective for making the article manufacturing apparatus easier to understand.

The article manufacturing apparatus as recited in the fourth aspect of the present invention is the article manufacturing apparatus as recited in any one of the first through third aspects, further comprising a selecting means that selects whether to display the guidance screen.

In the present article manufacturing apparatus the selecting means can select whether to display the guidance screen. The provision of guidance on the operation procedure by the guidance screen enables the appropriate operation of the article manufacturing apparatus, which is convenient. However, some users may be familiar with the operation details of the article manufacturing apparatus, and may not need the guidance screen. The present article manufacturing apparatus does not display the guidance screen when not needed, and can display the guidance screen when needed. Consequently, the article manufacturing apparatus can be operated efficiently by not displaying the guidance screen when not needed.

The article manufacturing apparatus as recited in the fifth aspect of the present invention is the article manufacturing apparatus as recited in the fourth aspect, further comprising a storage means. The storage means stores the operation level of the user who operates the article manufacturing apparatus, and whether or not to display the guidance screen corresponding to the operation level. Further, the selecting means displays the guidance screen based on whether or not to display the guidance screen stored by the storage means.

In the present article manufacturing apparatus, the selecting means displays the guidance screen based on whether or not to display a guidance screen that corresponds to the user level stored by the storage means. Consequently, it is possible to automatically display or not display the guidance screen corresponding to the operation level of the user, e.g., by not displaying the guidance screen if the operation level of the user is high and the user is familiar with the article manufacturing apparatus, and by displaying the guidance screen if the operation level of the user is low, and the user is unfamiliar with the article manufacturing apparatus. Thereby, the article manufacturing apparatus can be efficiently operated according to the operation level of the user.

PREFERRED EMBODIMENTS

Figure 1:
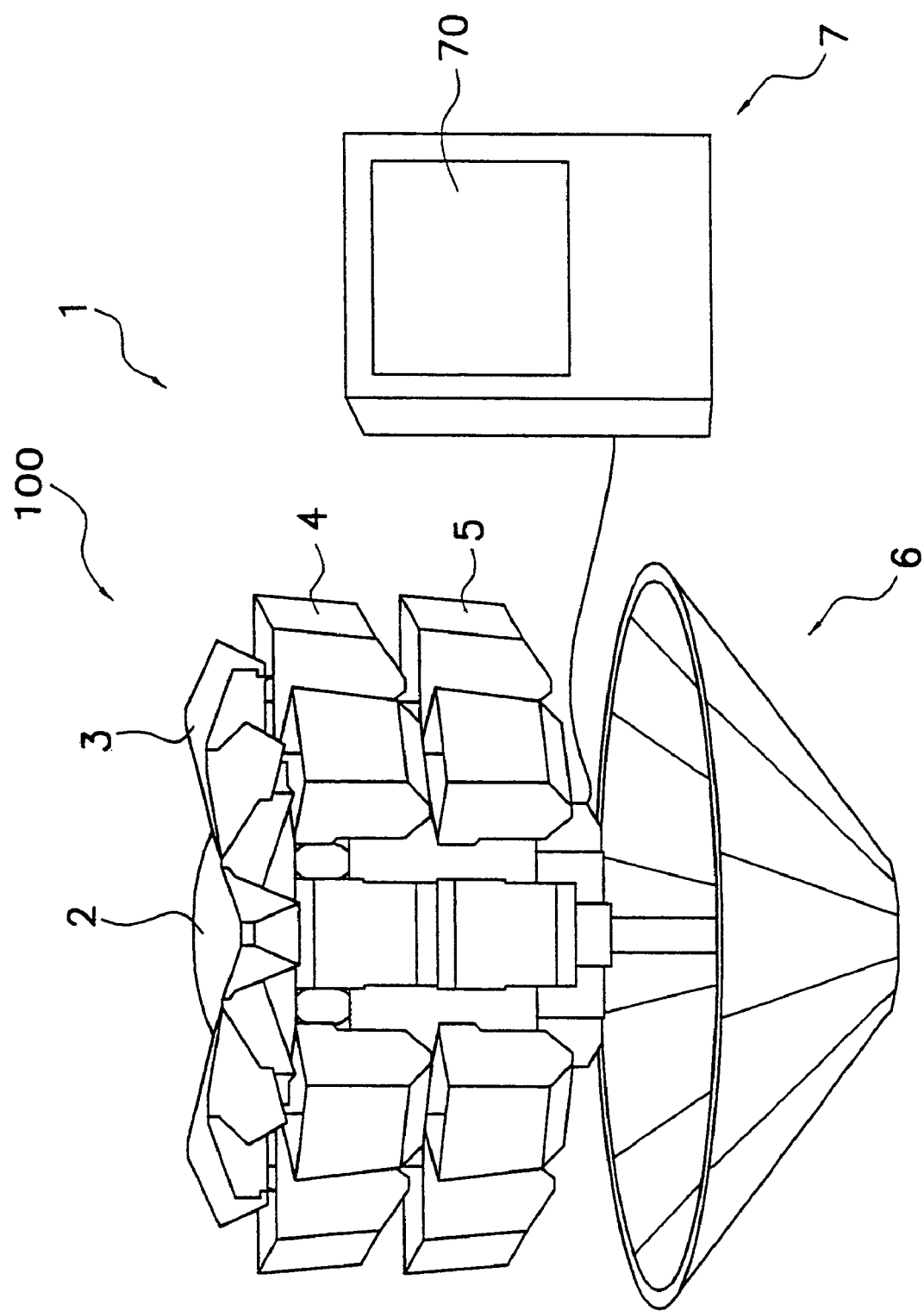
FIG. 1 is an exterior view of the combinational weighing apparatus.

FIG. 1 illustrates a combinational weighing apparatus 1 according to one embodiment of the present invention. The combinational weighing apparatus 1 is one of the article manufacturing apparatuses arranged in an article manufacturing line wherein articles like food products and industrial products are manufactured, and that weighs a plurality of articles and discharges a predetermined weight or quantity of articles.

Constitution

Overview

Figure 2:
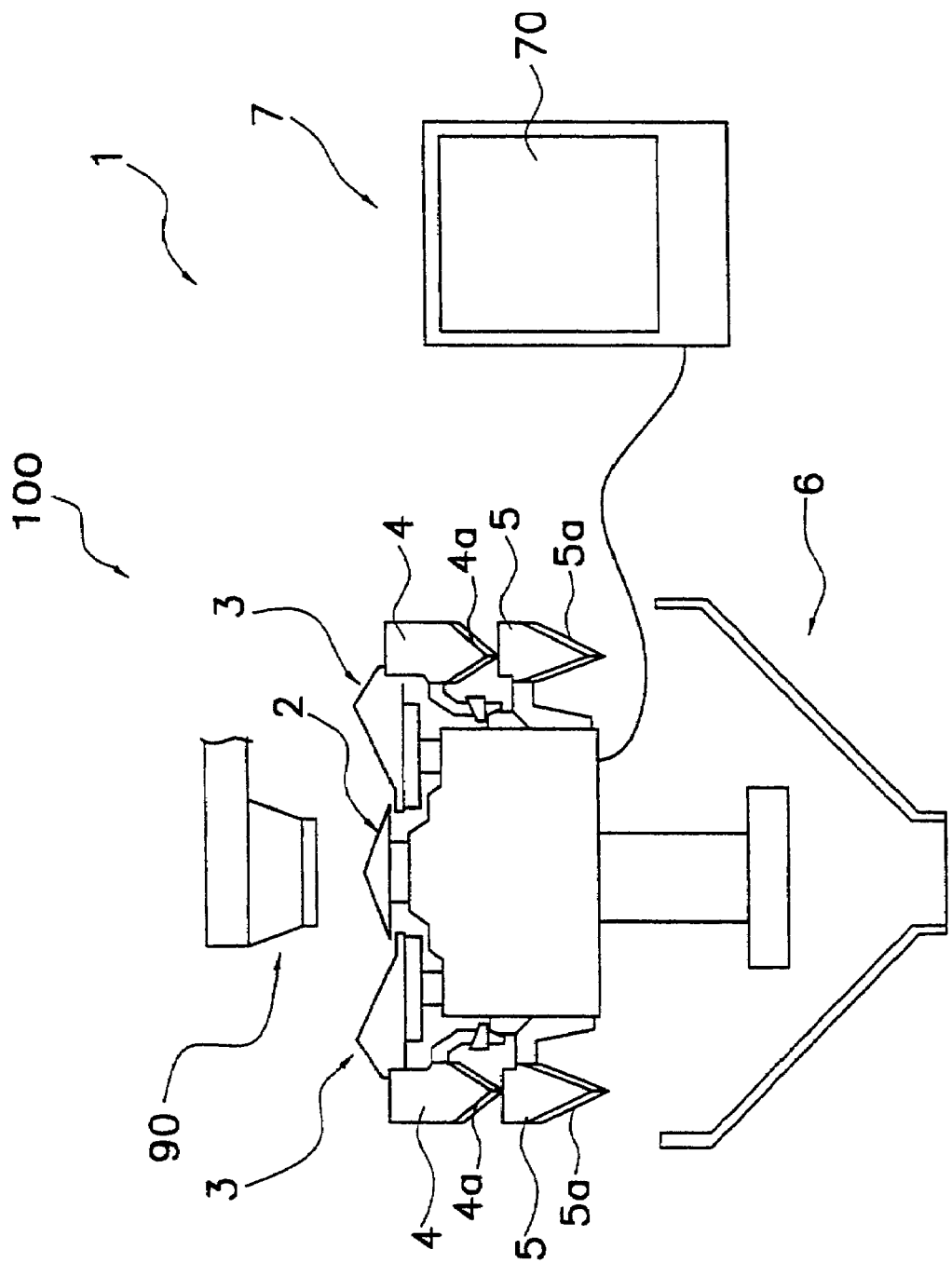
FIG. 2 is a side schematic view that depicts the constitution of the combinational weighing apparatus.

FIG. 2 is a side schematic view that illustrates the constitution of the combinational weighing apparatus 1.

Figure 3:
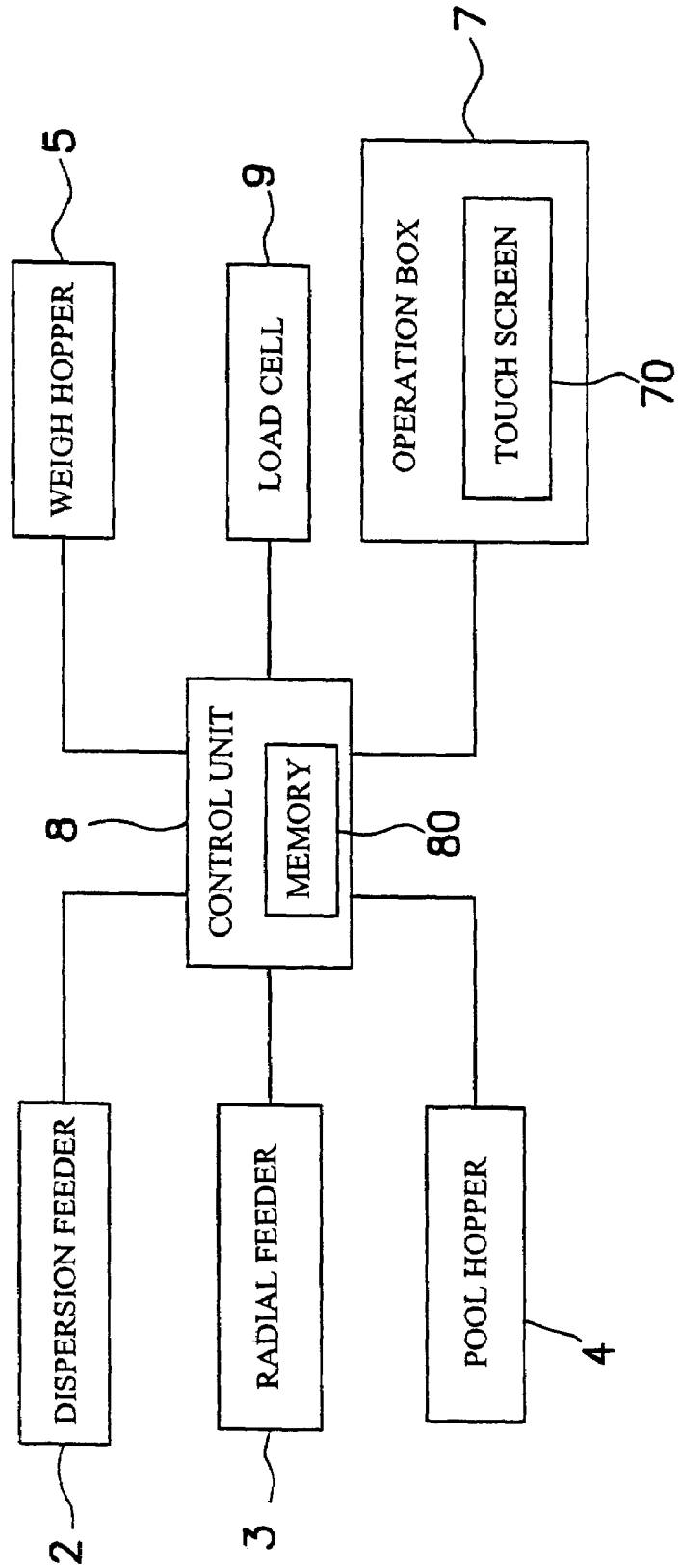
FIG. 3 is a control block diagram.

The combinational weighing apparatus 1 comprises a dispersion feeder 2, radial feeders 3, pool hoppers 4, weigh hoppers 5, a collection and discharge chute 6, an operation box 7, and a control unit 8 (refer to FIG. 3). The radial feeders 3, the pool hoppers 4, and the weigh hoppers 5 are respectively disposed circularly. The dispersion feeder 2, the radial feeders 3, the pool hoppers 4, the weigh hoppers 5, and the collection and discharge chute 6 collectively function as an apparatus manufacturing unit 100.

Furthermore, a related radial feeder 3, pool hopper 4, and weigh hopper 5 are referred to as a head.

Constitution of Each Component of the Combinational Weighing Apparatus 1

The dispersion feeder 2 is a flat, conical, table-shaped member. The dispersion feeder 2 receives the supply of articles to be weighed from a feed conveyor 90, which is provided above the dispersion feeder 2. The dispersion feeder 2 vibrates by an electromagnet (not shown) located therebelow, transports the articles to be weighed supplied on its upper surface radially while dispersing the articles to be weighed circumferentially, and supplies the articles to be weighed to the radial feeders 3.

The radial feeder 3 is a member made of sheet metal formed by bending a stainless steel plate, and a plurality of radial feeders 3 are arranged along the circumference of the dispersion feeder 2. Each radial feeder 3 vibrates by an electromagnet (not shown) located therebelow, transports the articles to be weighed in the radial direction, and supplies the articles to be weighed to the pool hopper 4 of the same head. Furthermore, the vibration amplitude and vibration time of the electromagnet adjusts the transport capability of each radial feeder 3. Thereby, the weight of the articles to be weighed held in each pool hopper 4 is controlled so that it falls within a predetermined range.

The pool hopper 4 is arranged below the tip part of each radial feeder 3, and temporarily pools the articles to be weighed supplied from the respective radial feeder 3. By a command of the control unit 8 (discussed later), a pool hopper 4 opens a gate 4a provided in the lower part thereof, and the articles to be weighed are supplied to the weigh hopper 5 of the same head.

The weigh hopper 5 is arranged directly below each pool hopper 4, and weighs the articles to be weighed supplied from the pool hopper 4 by means of a load cell 9 (refer to FIG. 3). By a command of the control unit 8 (discussed later), the weigh hopper 5 opens a gate 5a provided in the lower part thereof, thereby discharging the articles to the collection and discharge chute 6.

The load cells 9 are weight measurement devices that weigh the articles to be weighed held in each weigh hopper 5. Each load cell 9 sends to the control unit 8 (discussed later) a weight signal, which is the result of weighing the articles to be weighed.

The collection and discharge chute 6 is a member that collects and discharges downward the articles to be weighed discharged from the weigh hoppers 5.

The operation box 7 is a member for responding to the user of the combinational weighing apparatus 1, and performs the functions of inputting settings of the combinational weighing apparatus 1, displaying the state of the combinational weighing apparatus 1, and the like. In other words, the operation box 7 functions as the display unit. The operation box 7 is provided with a touch screen 70. The touch screen 70 is, for example, a liquid crystal display (LCD), and displays a "MAIN MENU" screen 10 (operation screen), a "PRODUCTION" screen 40, an "ASSISTANT" screen (guidance screen), and the like. The "MAIN MENU" screen 10 and the "PRODUCTION" screen 40 indicate the operation details to be performed by the combinational weighing apparatus 1, and the "ASSISTANT" screen provides procedural guidance on the operation details. These screens will be discussed later. In addition, the touch screen 70 is a member that is provided with both input and display functions in parallel. The user of the combinational weighing apparatus 1 presses buttons and the like displayed on the touch screen 70, and information is thereby input into the combinational weighing apparatus 1.

The control unit 8 controls the combinational weighing apparatus 1. The control unit 8 controls the combinational weighing of the articles to be weighed, and controls the display of screens on the touch screen 70. FIG. 3 depicts a control block diagram.

The control unit 8 is provided with a CPU (not shown), memory 80, and the like. The control unit 8 is operatively connected to the dispersion feeder 2, the radial feeders 3, the pool hoppers 4, the weigh hoppers 5, and the operation box 7, and controls each of these components. In addition, the control unit 8 is connected to the load cells 9, and receives the weight signals from the load cells 9. The weight data received from the load cells 9 is stored in the memory 80. In addition, image data is also stored in the memory 80, and the control unit 8 displays on the touch screen 70 the image data stored in the memory 80. This way, the control unit 8 functions as the operation unit.

Weighing Operation

The following explains the weighing operation performed by the combinational weighing apparatus 1, referencing FIG. 2.

First, the articles to be weighed are transported to the pool hoppers 4 by the feed conveyor 90, the dispersion feeder 2, and the radial feeders 3. When any one of the weigh hoppers 5 provided directly below each pool hopper 4 is empty, the control unit 8 sends a signal to open the gate 4a of the pool hopper 4 in the same head as the empty weigh hopper 5, and the articles to be weighed held in the pool hopper 4 are supplied to the weigh hopper 5.

The articles to be weighed held in each weigh hopper 5 are weighed by a load cell 9 installed in each weigh hopper 5. The weight signal output from each load cell 9 is sent to the control unit 8. Further, the weight signal value of each load cell 9 is stored in the memory 80 as the weight of the articles to be weighed held in each weigh hopper 5.

In accordance with a combinational calculation program stored in the memory 80, the control unit 8 performs a combinational calculation based on the weight data of the articles to be weighed held in each weigh hopper 5 so that a predetermined weight value is reached. Based on the results of the combinational calculation, the control unit 8 selects a plurality of weigh hoppers 5. Thereby, the control unit 8 sends a signal to open the gates 5a of the selected weigh hoppers 5, and discharges the articles to be weighed held in the weigh hoppers 5 into the collection and discharge chute 6. The discharged articles to be weighed are supplied to and processed by downstream equipment.

Touch Screen 70 Display

In the present combinational weighing apparatus 1, the touch screen 70 of the operation box 7 displays screens that indicate information like the status and settings of the combinational weighing apparatus 1, and screens that indicate the operation details to be performed by the combinational weighing apparatus 1. In addition, the touch screen 70 displays buttons for indicating the operation details to be performed by the combinational weighing apparatus 1, and by touching the buttons on the screen the user of the combinational weighing apparatus 1 can input relevant operation details.

The following explains the various screens displayed on the touch screen 70.

Furthermore, the users of the combinational weighing apparatus 1 are principally considered to be an operator who operates the combinational weighing apparatus 1 for manufacturing articles, and an engineer who performs setup and maintenance of the combinational weighing apparatus 1. In the present combinational weighing apparatus 1, the user of the combinational weighing apparatus 1 can select the screen displayed in accordance with the usage purpose and his or her own operation level.

Main Menu Screen

Figure 4:
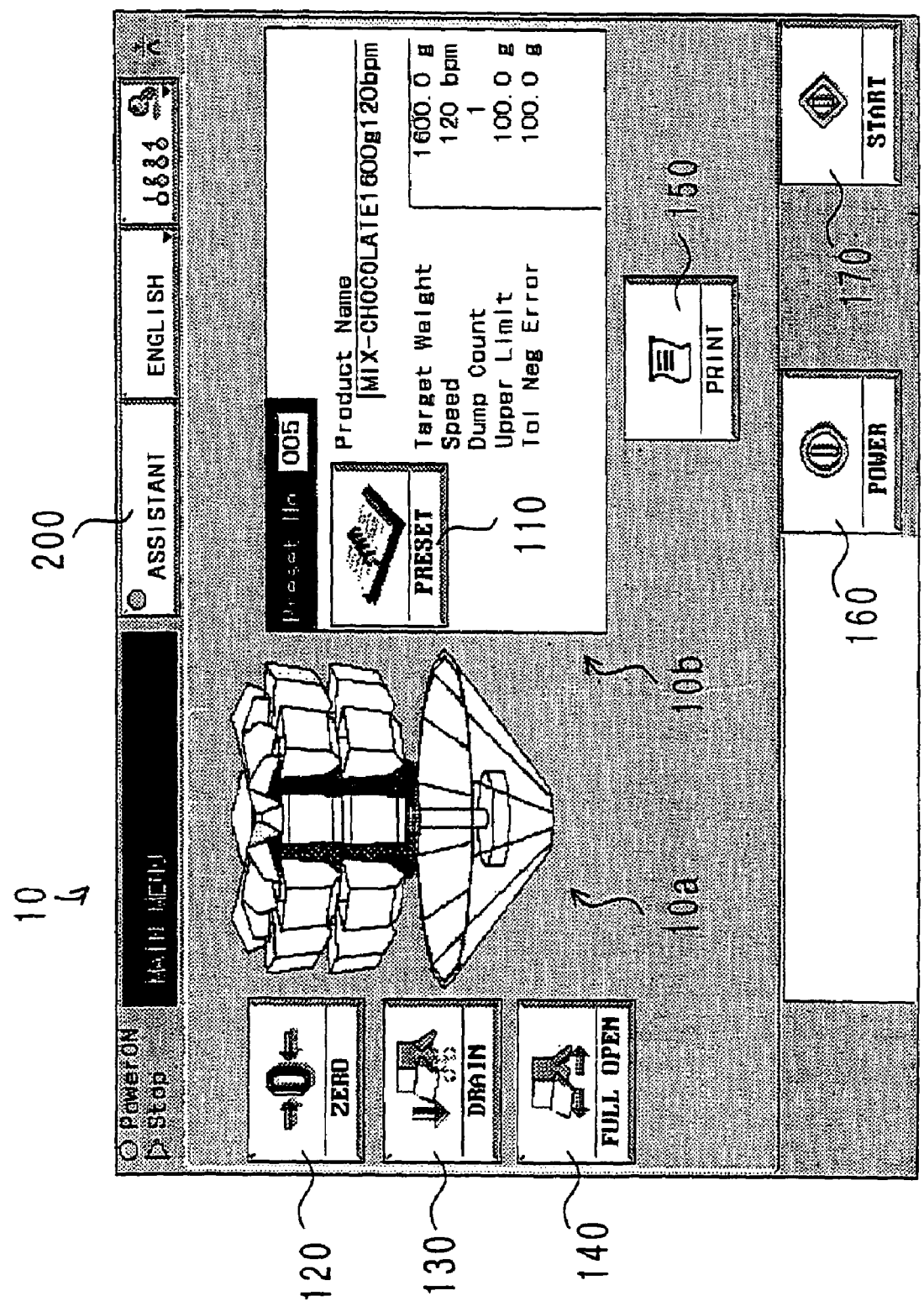
FIG. 4 is a diagram of the "MAIN MENU" screen.

FIG. 4 depicts the "MAIN MENU" screen 10. This "MAIN MENU" screen 10 is principally displayed when the operator sets or operates the combinational weighing apparatus 1. The operator can input settings and operation details by touching a button, among a plurality of buttons appearing on the screen 10, corresponding to the operation details desired by the operator. The "MAIN MENU" screen 10 displays a model 10a, in which the combinational weighing apparatus 1 is represented three-dimensionally, and the currently selected preset details 10b. In addition, the "MAIN MENU" screen 10 displays a "PRESET" button 110, a "ZERO" button 120, a "DRAIN" button 130, a "FULL OPEN" button 140, a "PRINT" button 150, a "POWER" button 160, a "START" button 170, and an "ASSISTANT" button 200.

Figure 5:
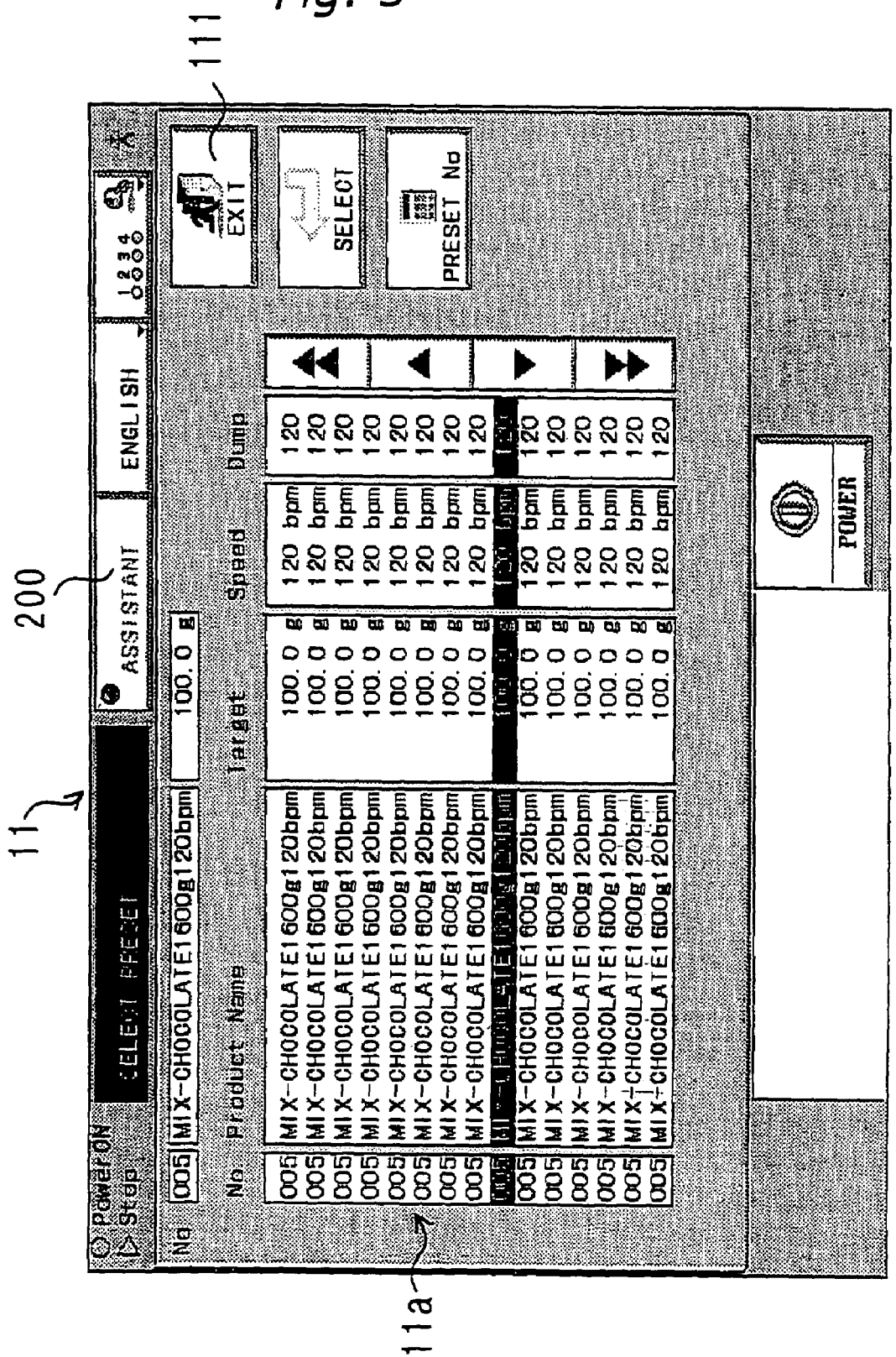
FIG. 5 is a diagram of the "SELECT PRESET" screen.

If the "PRESET" button 110 is pressed, then a "SELECT PRESET" screen 11 shown in FIG. 5 is displayed. The "SELECT PRESET" screen 11 is for selecting the desired settings from among the preset settings. This screen 11 displays a table 11a, which lists for each preset number the product name, the target weight, the weighing speed, and the like, of the articles to be combinationally weighed. The operator selects and inputs the desired setting on the screen 11. If an "EXIT" button 111 on the screen is pressed, then processing returns to the "MAIN MENU" screen 10.

Figure 6:
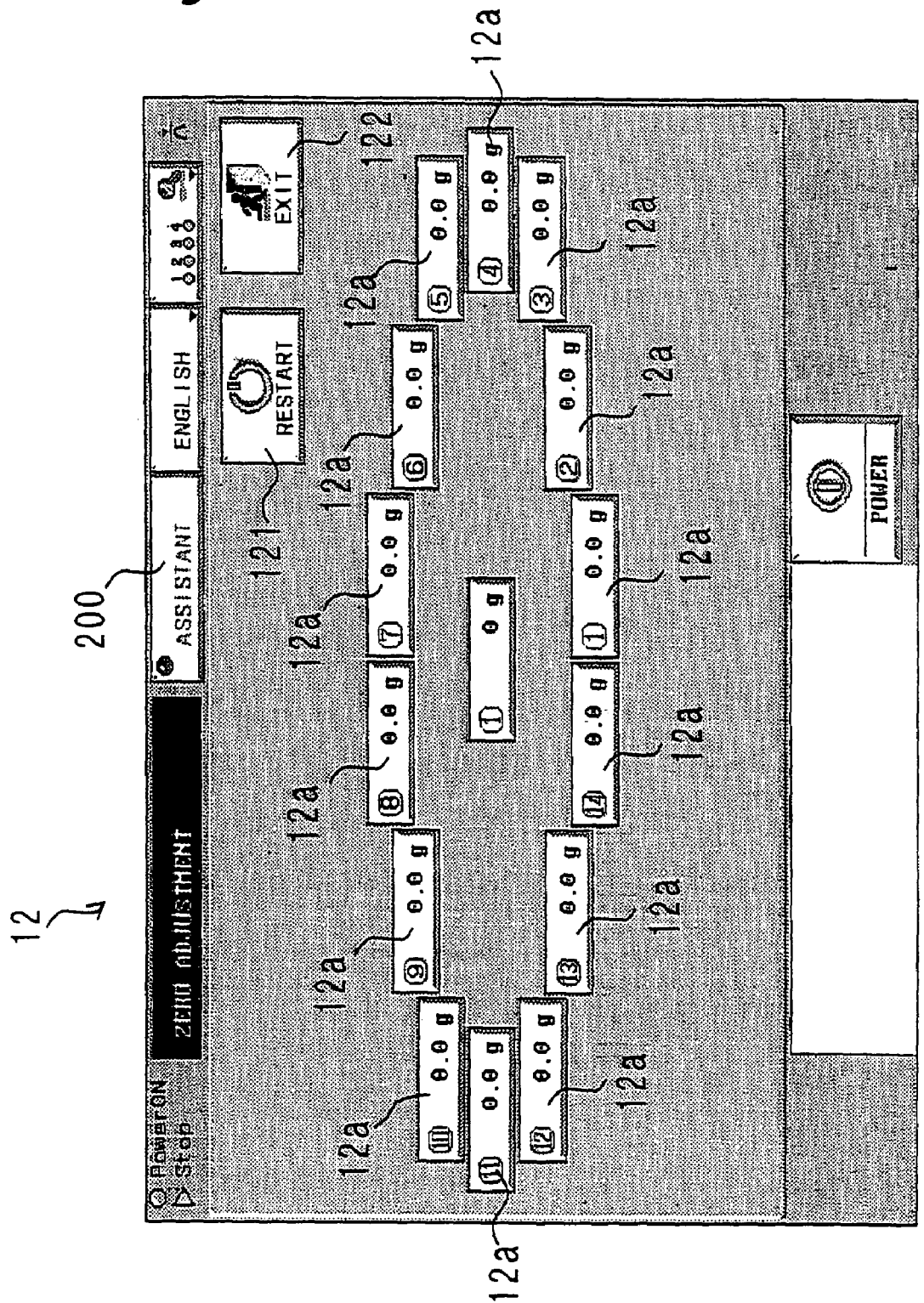
FIG. 6 is a diagram of the "ZERO ADJUSTMENT" screen.

If the "ZERO" button 120 is pressed, then a "ZERO ADJUSTMENT" screen 12 shown in FIG. 6 is displayed. The "ZERO ADJUSTMENT" screen 12 is for zero adjusting the weigh hoppers 5. This screen 12 displays weights 12a of the articles to be weighed held by each of the weigh hoppers 5, a "RESTART" button 121, and an "EXIT" button 122. The weights 12a of the articles to be weighed held by each of the weigh hoppers 5 are displayed circularly corresponding to the actual arrangement of the weigh hoppers 5. Each weigh hopper 5 is zero adjusted by the operator pressing the "RESTART" button 121. If the operator presses the "EXIT" button 122, then processing returns to the "MAIN MENU" screen 10.

Figure 7:
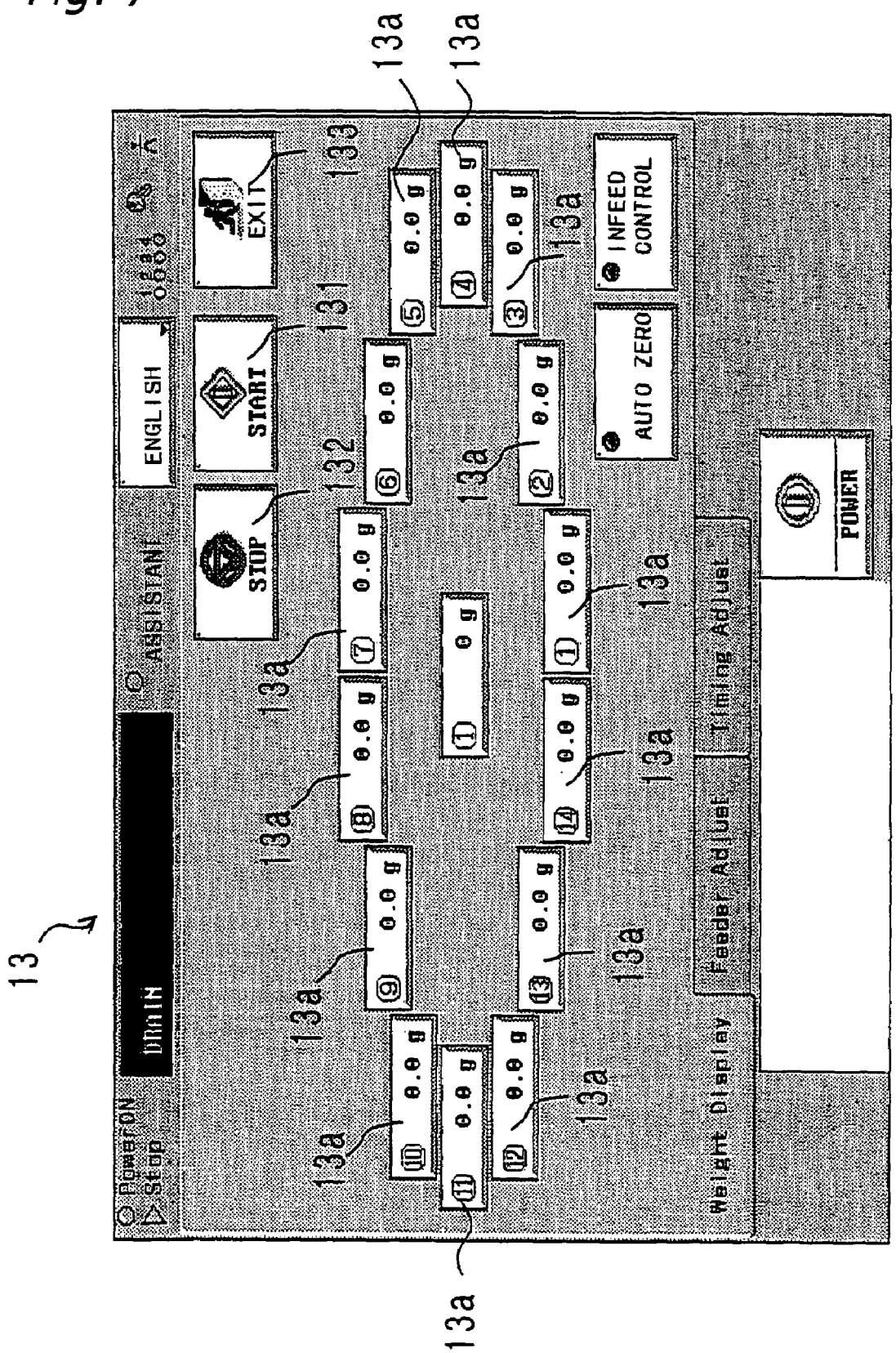
FIG. 7 is a diagram of the "DRAIN" screen.

If the "DRAIN" button 130 is pressed, then a "DRAIN" screen 13 shown in FIG. 7 is displayed. The "DRAIN" screen 13 is for discharging the articles to be weighed held by the weigh hoppers 5. The screen 13 displays weights 13a of the articles to be weighed held by each of the weigh hoppers 5, the same as in the "ZERO ADJUSTMENT" screen 12. The operator can discharge the articles to be weighed held by the weigh hoppers 5 by pressing a "START" button 131 or a "STOP" button 132 on the screen. If the operator presses an "EXIT" button 133, then processing returns to the "MAIN MENU" screen 10.

Figure 8:
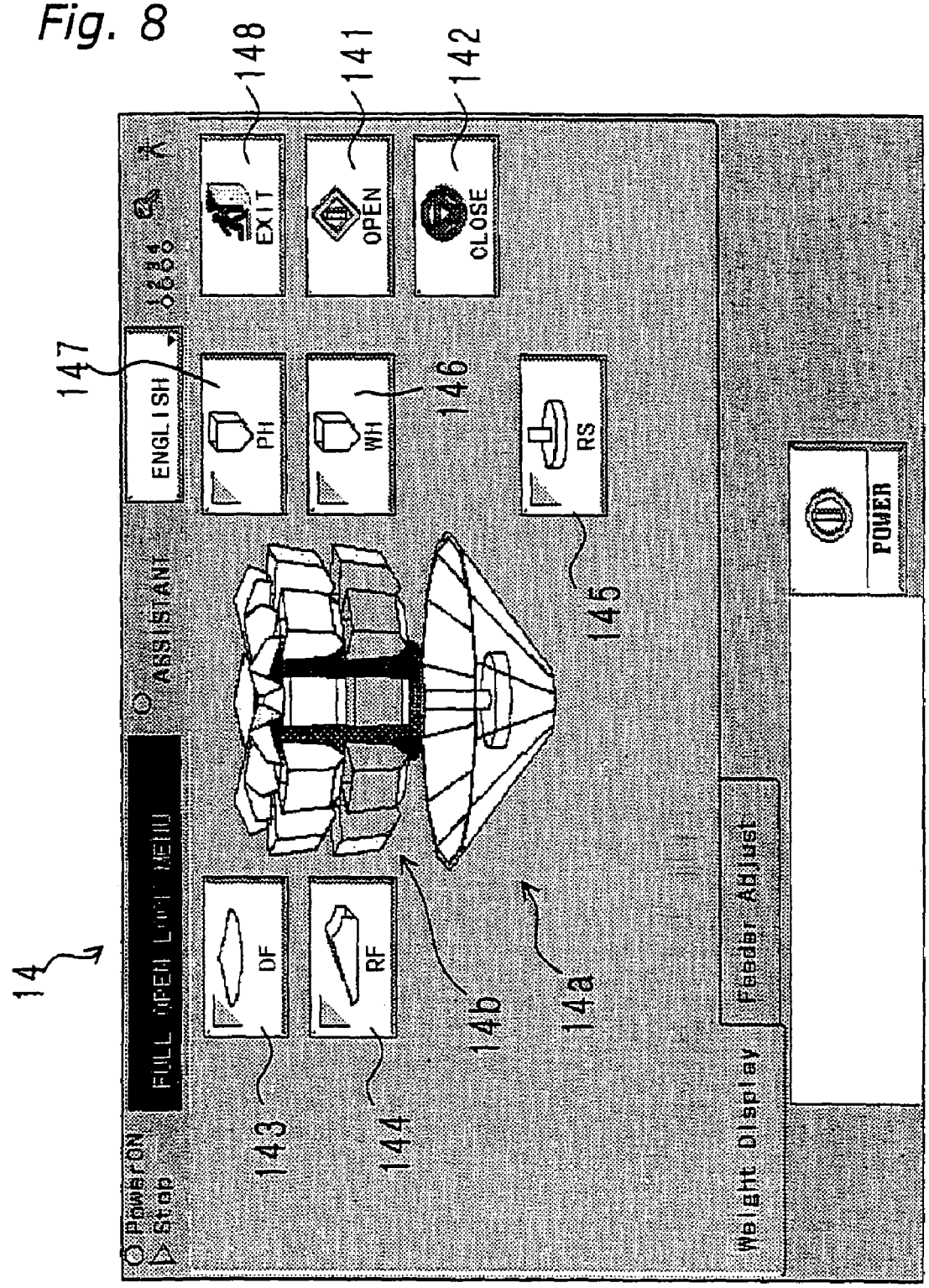
FIG. 8 is a diagram of the "FULL OPEN LOCK MENU" screen.

If the "FULL OPEN" button 140 is pressed, then a "FULL OPEN LOCK MENU" screen 14 shown in FIG. 8 is displayed. The "FULL OPEN LOCK MENU" screen 14 is for discharging the articles to be weighed from each member of the combinational weighing apparatus 1. By pressing an "OPEN" button 141 and a "CLOSE" button 142 in the screen 14, the articles to be weighed held in the target member can be discharged from the target member. In addition, buttons 143, 144, 147, 146, 145, which indicate the dispersion feeder 2, the radial feeders 3, the pool hoppers 4, the weigh hoppers 5, and the collection and discharge chute 6, are displayed on the screen. The operator can select the target member by pressing these buttons 143, 144, 145, 146, 147. In addition, if a certain member is selected, then the relevant location in a three-dimensional model 14a displayed on the screen is colored, making it easier for the operator to recognize the selected member. For example, in FIG. 8, the button 146 that indicates the weigh hoppers 5 is pressed, and the color of a location 14b corresponding to the weigh hoppers of the three-dimensional model 14a is modified. Furthermore, if the articles to be weighed are discharged from the target member, then the actual operation of the combinational weighing apparatus 1 is represented by animation of the three-dimensional model 14a on the screen. If the operator presses an "EXIT" button 148, then processing returns to the "MAIN MENU" screen 10.

If the "PRINT" button 150 is pressed, then the current settings and the like are printed out.

Pressing the "POWER" button 160 turns the power supply for the drive components of the combinational weighing apparatus 1 on and off.

If the "START" button 170 is pressed, then the combinational weighing apparatus 1 starts combinational weighing based on the set conditions.

If the "ASSISTANT" button 200 is pressed, then the "ASSISTANT" screen is displayed. The following discusses the details of the "ASSISTANT" screen.

Selection of Assistant Function

Various operations of the combinational weighing apparatus 1 can be performed from the "MAIN MENU" screen 10, as described above. It is convenient that the "MAIN MENU" screen 10 displays buttons that indicate a plurality of operation details, and various operations can thus be performed centrally. However, there are cases where an operator unfamiliar with the operation of the combinational weighing apparatus 1 does not know which button to press. The present combinational weighing apparatus 1 has an assistant function that explains on the touch screen 70 the information needed to appropriately operate the combinational weighing apparatus 1. The following explains the "ASSISTANT" screen that performs this assistant function.

Figure 9:
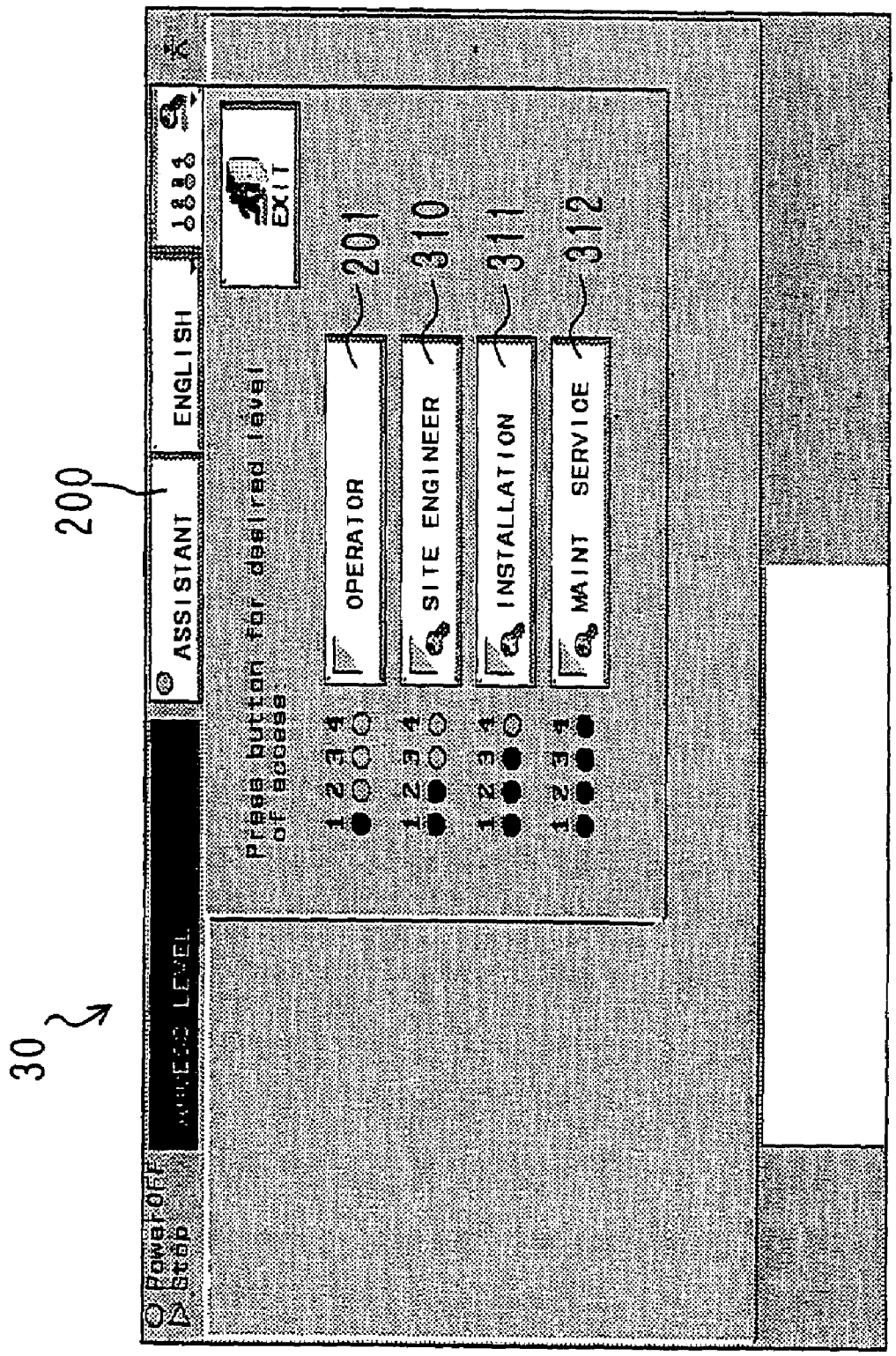
FIG. 9 is a diagram of the "ACCESS LEVEL" screen.

First, when the main power supply of the combinational weighing apparatus 1 is turned on, an "ACCESS LEVEL" screen 30 shown in FIG. 9 is displayed. This screen displays an "OPERATOR" button 201, a "SITE ENGINEER" button 310, an "INSTALLATION" button 311, and a "MAINT SERVICE" button 312. These buttons 201, 310, 311, 312 select the operation level of the user who is operating the combinational weighing apparatus 1, and the respective level is indicated by the number of colored lamps. Furthermore, the greater the number of colored lamps, the higher the operation level of the user, i.e., the more the user is familiar with and understands the operation of the combinational weighing apparatus 1. The "OPERATOR" button 201 is for selecting the regular operator who works on the manufacturing line. The other buttons 310, 311, 312 are selected by an engineer having an operation level higher than the regular operator and who performs installation and maintenance of the combinational weighing apparatus 1. Furthermore, the respective operation level, and whether or not to display the "ASSISTANT" screen, which is set for each operation level, are stored in the memory 80 of the control unit 8, and the screen displayed next is determined in accordance with the operation level selected by this screen 30. Herein, the memory 80 stores the fact that the "ASSISTANT" screen is displayed if the "OPERATOR" button 201 is selected, and that the "ASSISTANT" screen is not displayed if the other buttons 310, 311, 312 are pressed.

Figure 10:
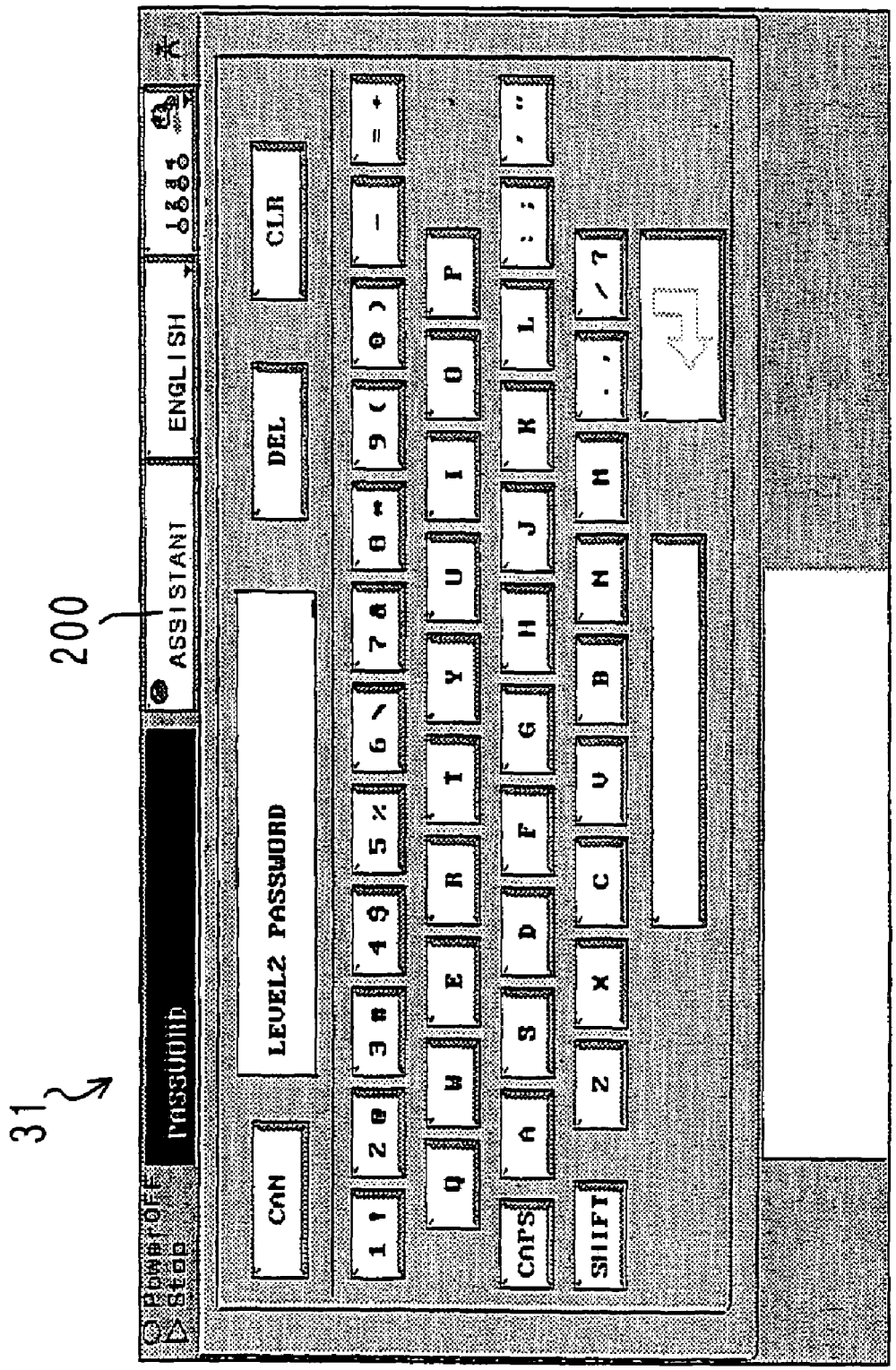
FIG. 10 is a diagram of the "PASSWORD" screen.
Figure 11:
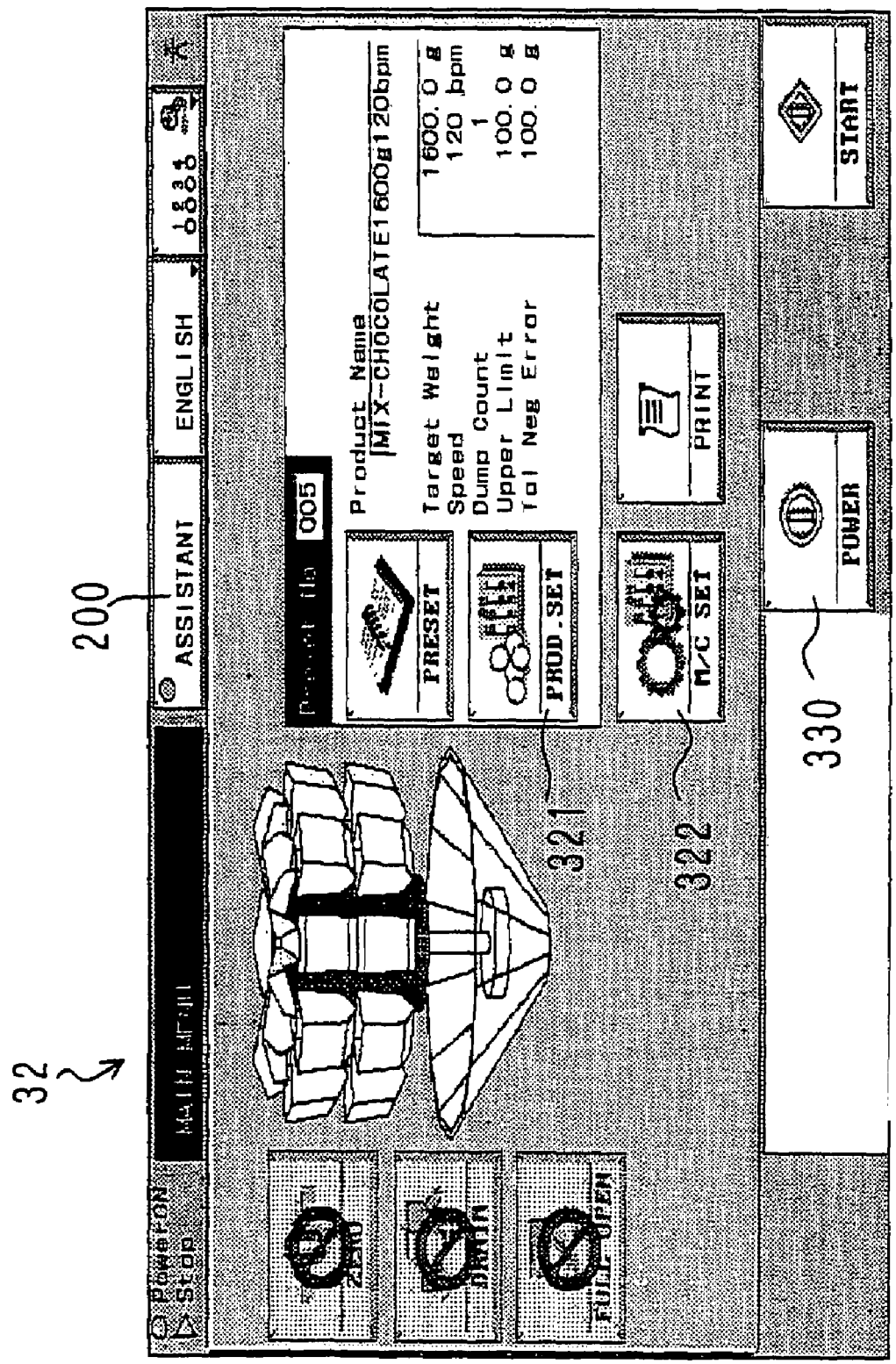
FIG. 11 is a diagram of the "MAIN MENU" screen for initialization.
Figure 12:
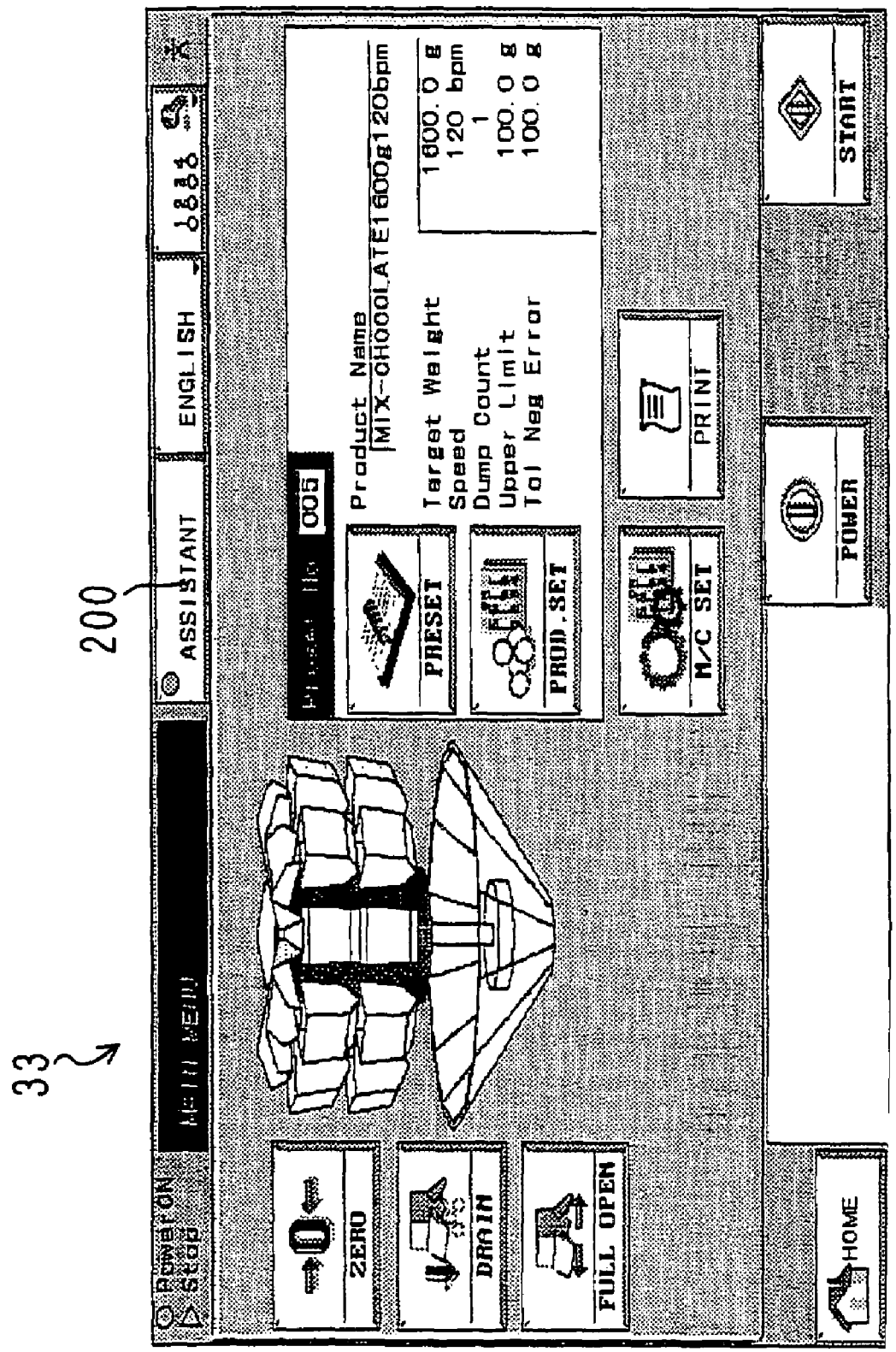
FIG. 12 is a diagram of the "MAIN MENU" screen for the engineer.

If the buttons 310, 311, 312 other than the "OPERATOR" button 201 are pressed, then a "PASSWORD" screen 31 shown in FIG. 10 is displayed. In the "PASSWORD" screen 31, the user inputs the password corresponding to his or her operation level. If the correct password is input, then a "MAIN MENU" screen 32 for initialization shown in FIG. 11 is displayed. Buttons are displayed in this screen 32, e.g., a "PROD. SET" button 321 and a "M/C SET" button 322, for operations needed to perform initialization and maintenance work. In addition, if a "POWER" button 330 is pressed, then a "MAIN MENU" screen 33 for an engineer, shown in FIG. 12, is displayed. In addition to the displayed contents of the "MAIN MENU" screen 10 for a regular operator, the screen 33 displays buttons 321, 322 for performing operations needed to perform initialization and maintenance work of the combinational weighing apparatus 1, as discussed above.

Figure 13:
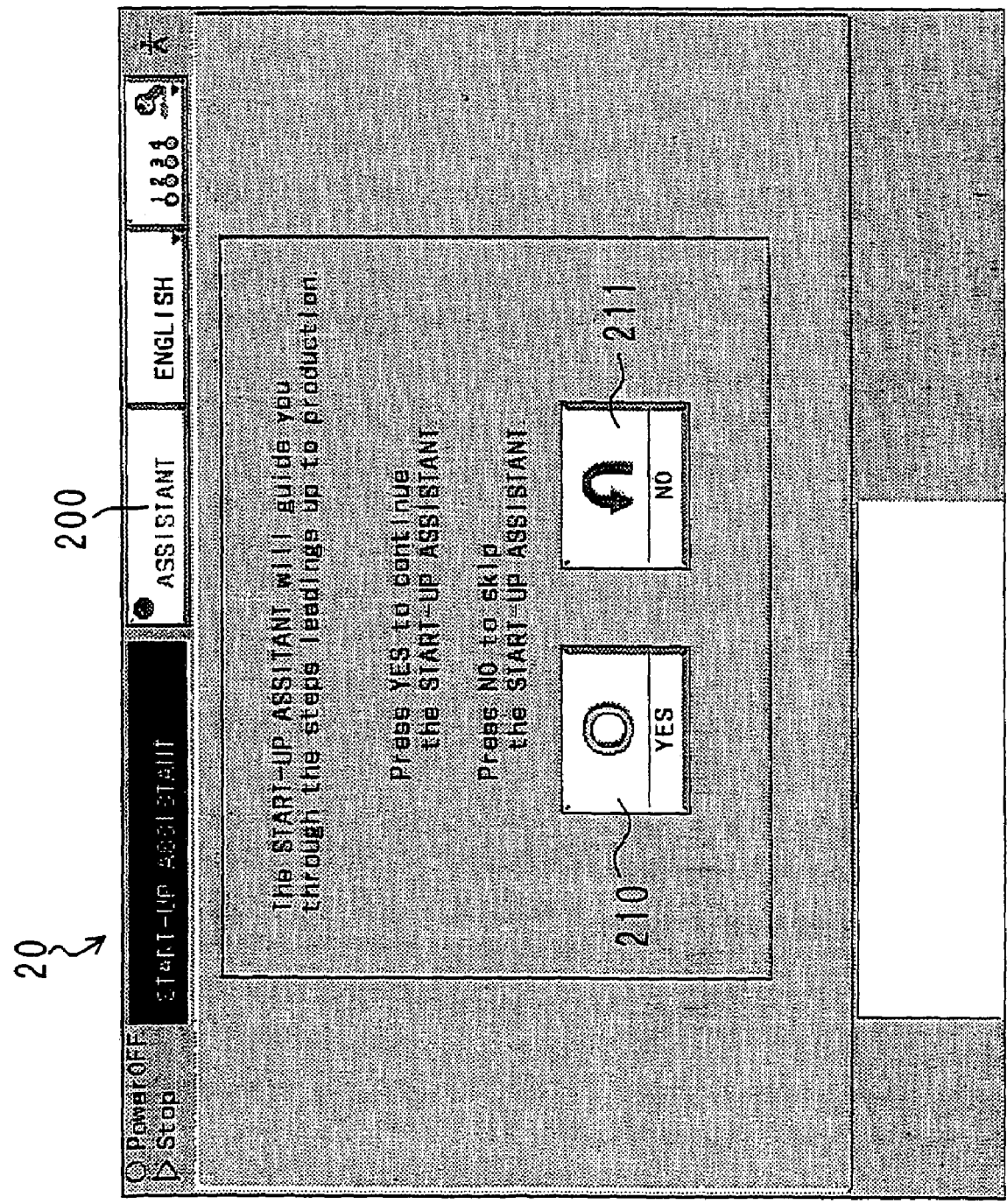
FIG. 13 is a diagram of the "START-UP ASSISTANT" screen.

If the "OPERATOR" button 201 in the "ACCESS LEVEL" screen 30 shown in FIG. 9 is pressed, then a "START-UP ASSISTANT" screen 20 shown in FIG. 13 is displayed. This screen 20 displays a "YES" button 210 and a "NO" button 211 for turning the assistant function on and off. Herein, if the "NO" button 211 is pressed, then the "MAIN MENU" screen 10 for an operator, previously discussed, is displayed. If the "YES" button 210 is pressed, then the "ASSISTANT" screens shown in FIG. 14 through FIG. 22 are displayed.

"Assistant" Screen

The following explains the "ASSISTANT" screen.

Figure 14:
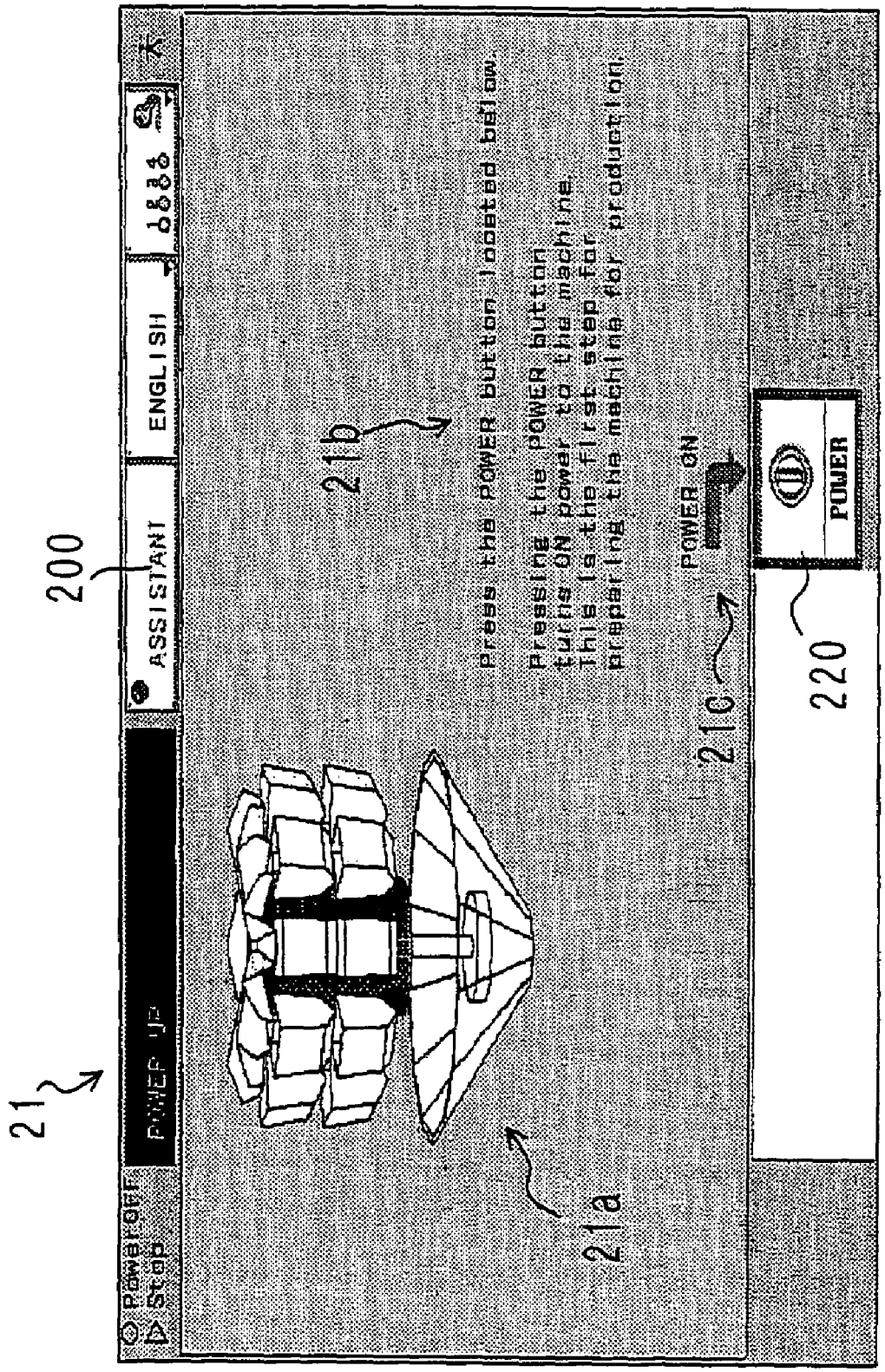
FIG. 14 is a diagram of the "POWER UP" screen.

If the "YES" button 210 in the "START-UP ASSISTANT" screen 20 shown in FIG. 13 is pressed, then a "POWER UP" screen 21 shown in FIG. 14 is displayed. The "POWER UP" screen 21 guides the operator to first press a "POWER"

button 220. This screen displays a three-dimensional model 21a of the combinational weighing apparatus 1 and the "POWER" button 220. In addition, an explanation 21b is displayed that explains that the power supply of the combinational weighing apparatus 1 will turn on if the "POWER" button is pressed or a command is given to that effect, and an arrow 21c that points to the "POWER" button is also displayed. In addition, the "POWER" button 220 is displayed in flashing mode.

Figure 15:
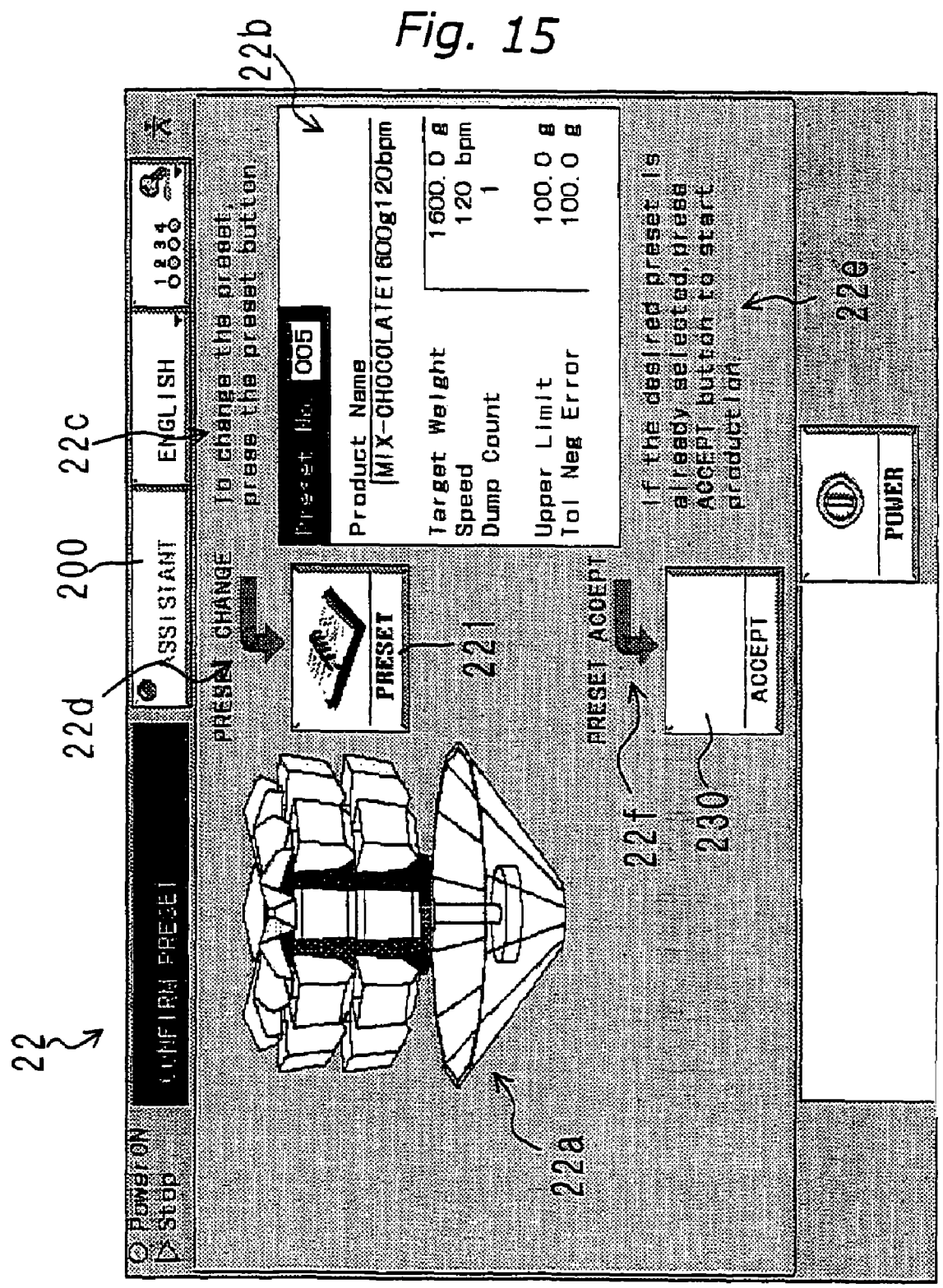
FIG. 15 is a diagram of the "CONFIRM PRESET" screen.

If the "POWER" button 220 is pressed, then a "CONFIRM PRESET" screen 22 shown in FIG. 15 is displayed. The "CONFIRM PRESET" screen 22 provides guidance on confirming the preset details. This screen 22 displays a three-dimensional model 22a of the combinational weighing apparatus 1, details 22b of the currently selected preset, a "PRESET" button 221, and an "ACCEPT" button 230. In addition, an explanation 22c that instructs the pressing of the "PRESET" button if it is desired to change the current preset, an arrow 22d that points to the "PRESET" button 221, an explanation 22e that instructs the pressing of the "ACCEPT" button 230 if the current preset is acceptable, and an arrow 22f that points to the "ACCEPT" button 230 are displayed.

If the "PRESET" button 221 is pressed, then the "SELECT PRESET" screen 11 shown in FIG. 5 is displayed. If the operator selects the desired preset and presses the "EXIT" button 111, then processing returns to the "CONFIRM PRESET" screen 22 shown in FIG. 15.

Figure 16:
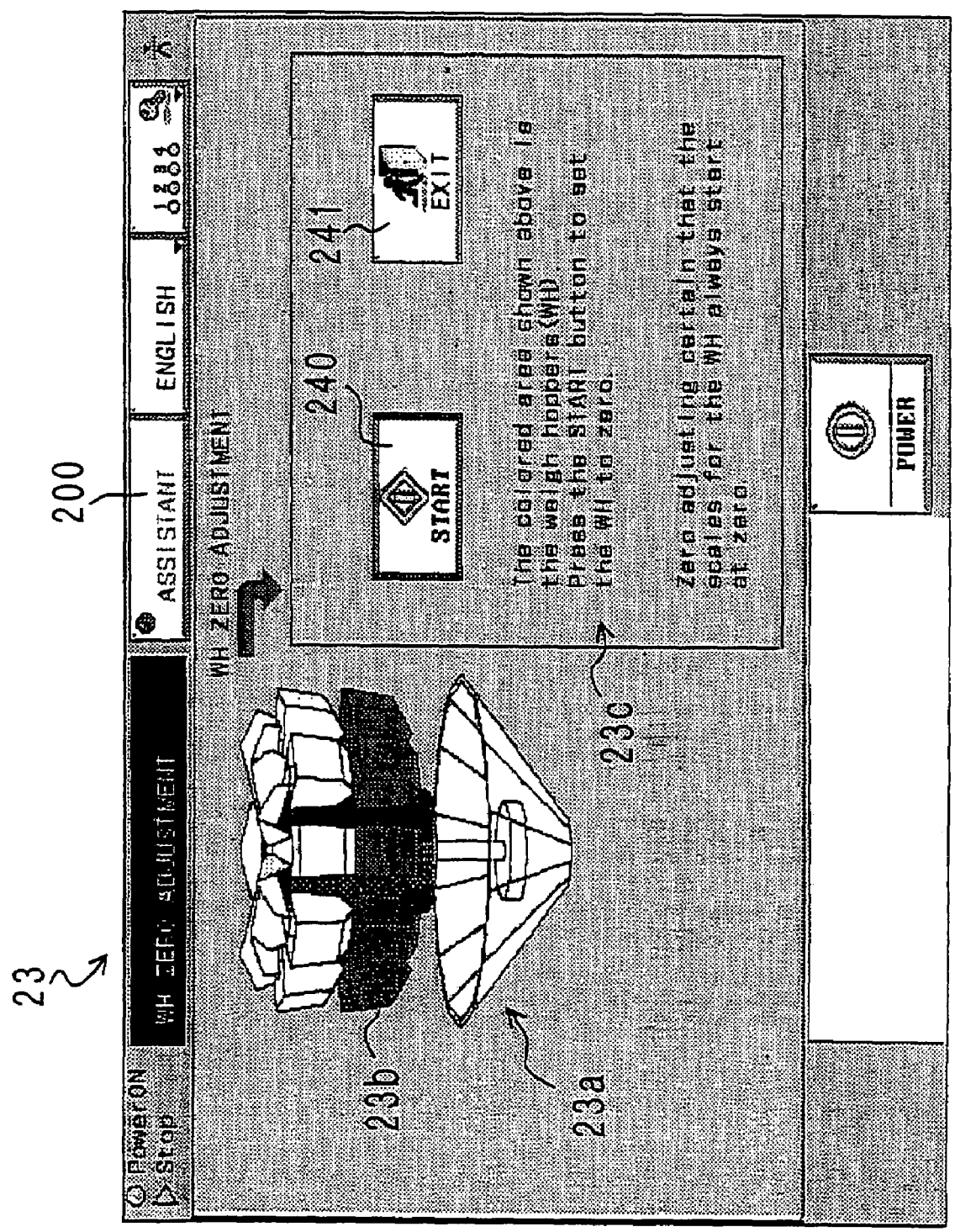
FIG. 16 is a diagram of the "WH ZERO ADJUSTMENT" screen.
Figure 17:
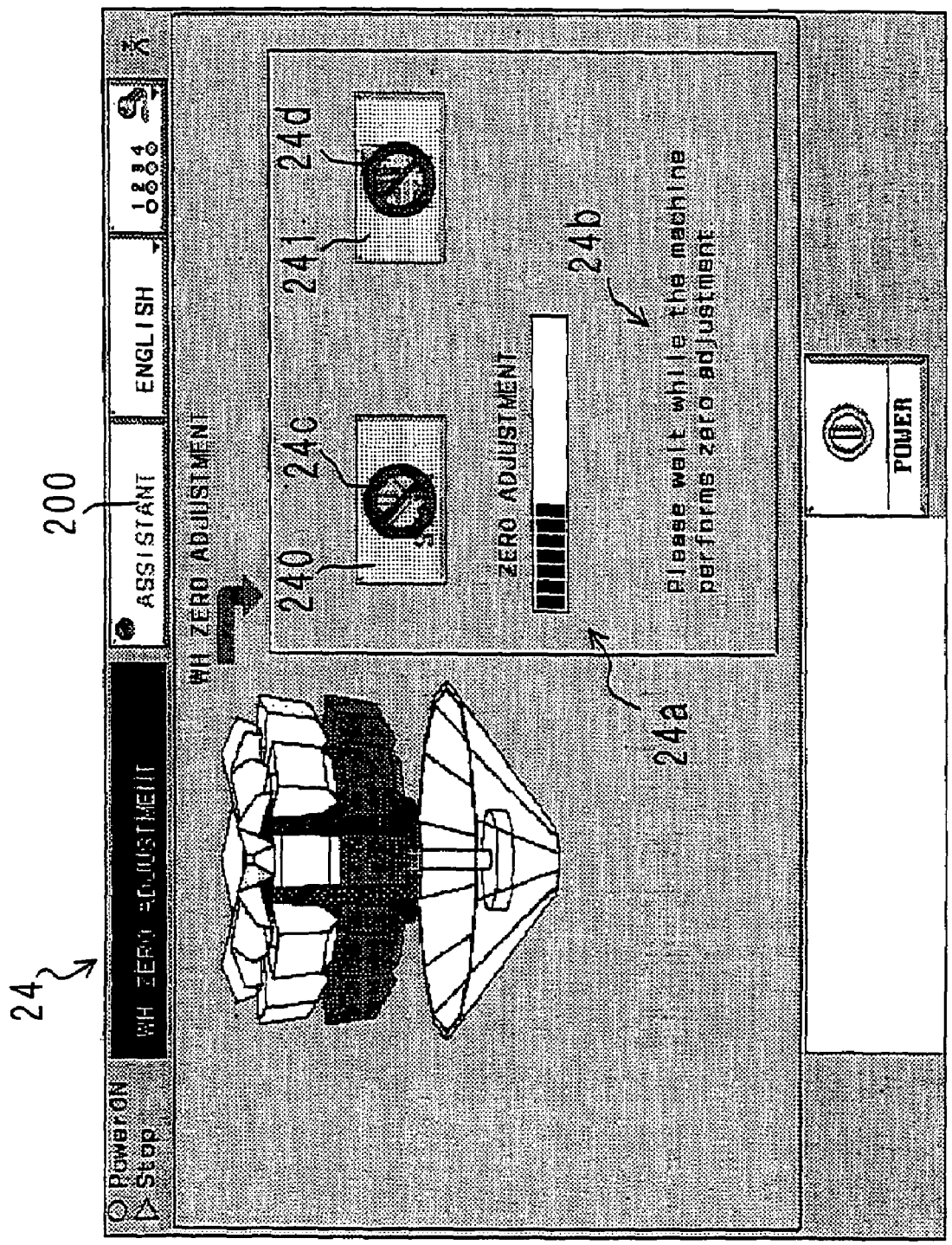
FIG. 17 is a diagram of the "WH ZERO ADJUSTMENT" screen that indicates whether zero adjustment is in progress.
Figure 18:
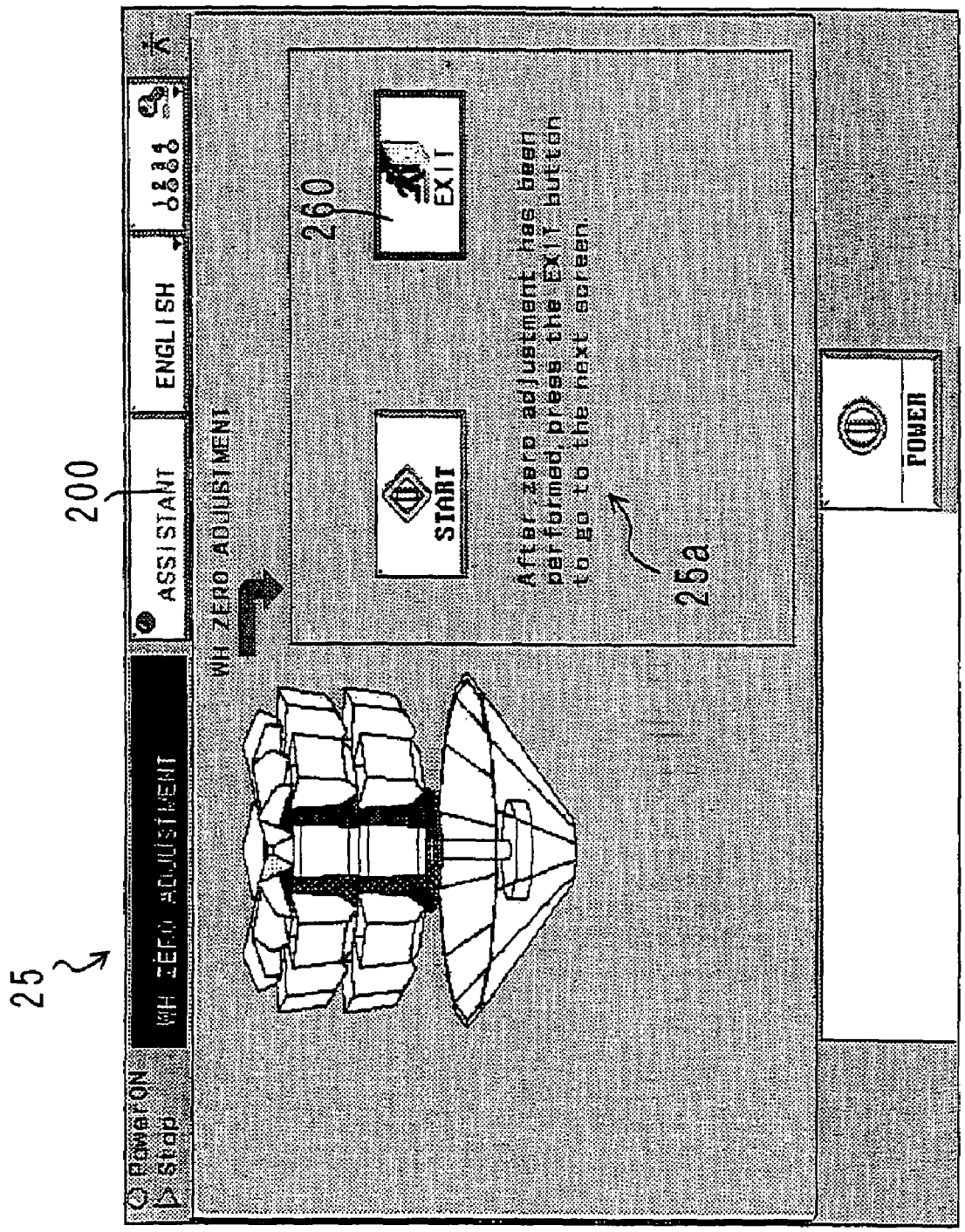
FIG. 18 is a diagram of the "WH ZERO ADJUSTMENT" screen that indicates that zero adjustment has finished.

If the "ACCEPT" button 230 is pressed, then "WH ZERO ADJUSTMENT" screens shown in FIG. 16 through FIG. 18 are displayed. The "WH ZERO ADJUSTMENT" screens provide guidance on zero adjusting the weigh hoppers 5.

First, a "WH ZERO ADJUSTMENT" screen 23 shown in FIG. 16 is displayed. This screen 23 displays a three-dimensional model 23a of the combinational weighing apparatus 1, a "START" button 240, and an "EXIT" button 241. The color of a portion 23b, which indicates the weigh hoppers 5 of the three-dimensional model 23a of the combinational weighing apparatus 1, is modified to make it easy to discriminate it from other members. Further, in the screen 23 an explanation 23c is displayed that explains that the colored portion is the weigh hoppers 5, that the weigh hoppers 5 will be zero adjusted if the "START" button is pressed, and that zero adjustment ensures that the weight value of the weigh hoppers 5 will start from zero. In addition, the "START" button 240 is displayed in flashing mode.

If the "START" button 240 is pressed, then a screen 24 is displayed that indicates that zero adjustment is in progress, as shown in FIG. 17. This screen 24 displays a scale 24a that indicates how much of the required time to complete the zero adjustment has elapsed. In addition, an explanation 24b is displayed that provides instruction to wait while zero adjustment is being performed. Furthermore, during this interval, the "START" button 240 and the "EXIT" button 241 will not accept input, and marks 24c, 24d are displayed to indicate that the "START" button 240 and the "EXIT" button 241 cannot accept input.

When the zero adjustment is finished, a screen 25 shown in FIG. 18 is displayed that indicates that the zero adjustment is finished. This screen 25 displays an explanation 25a that provides instruction to press the "EXIT" button 260 after the zero adjustment is finished in order to proceed to the next screen. In addition, the "EXIT" button 260 is displayed in flashing mode.

Figure 19:
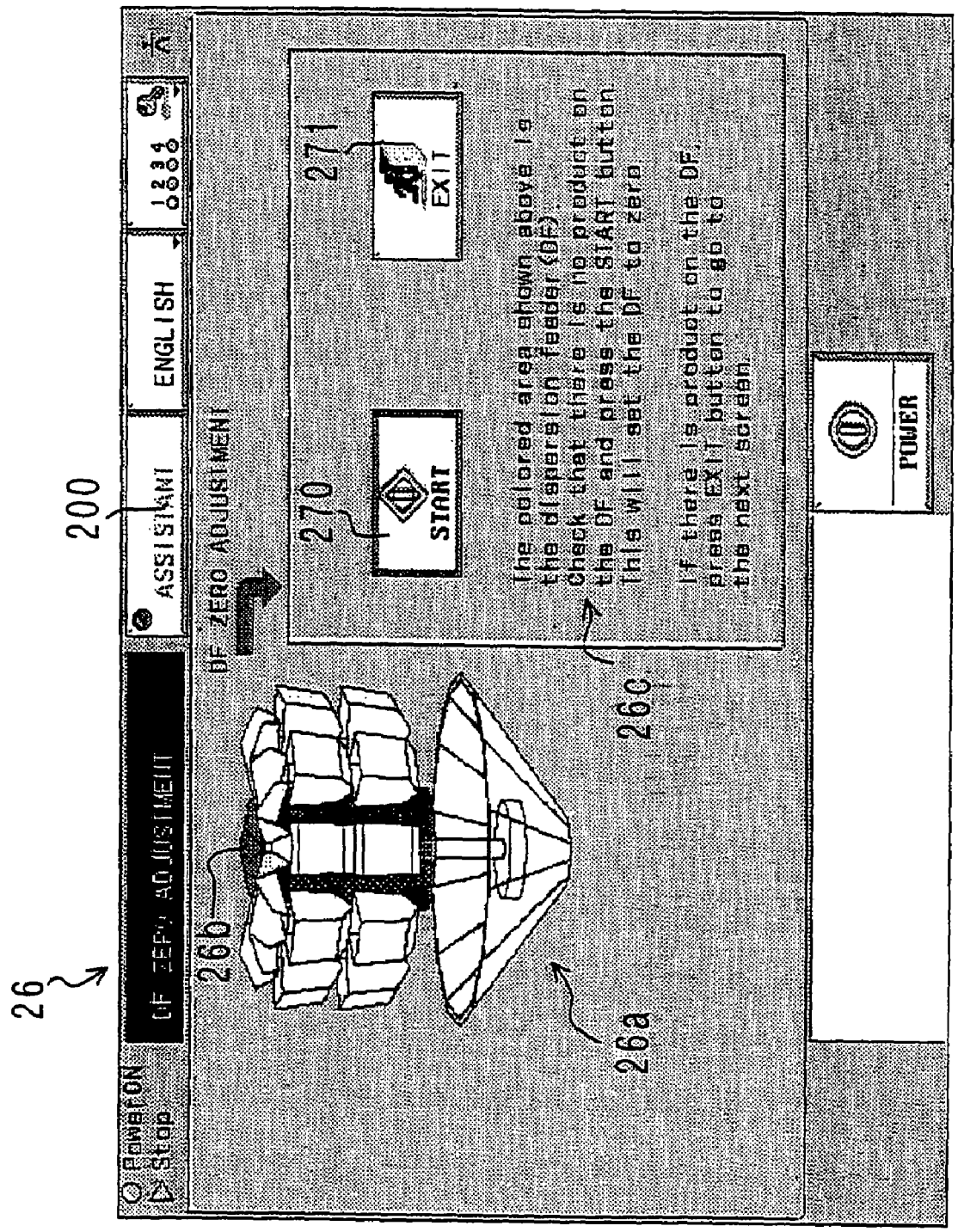
FIG. 19 is a diagram of the "DF ZERO ADJUSTMENT" screen.
Figure 20:
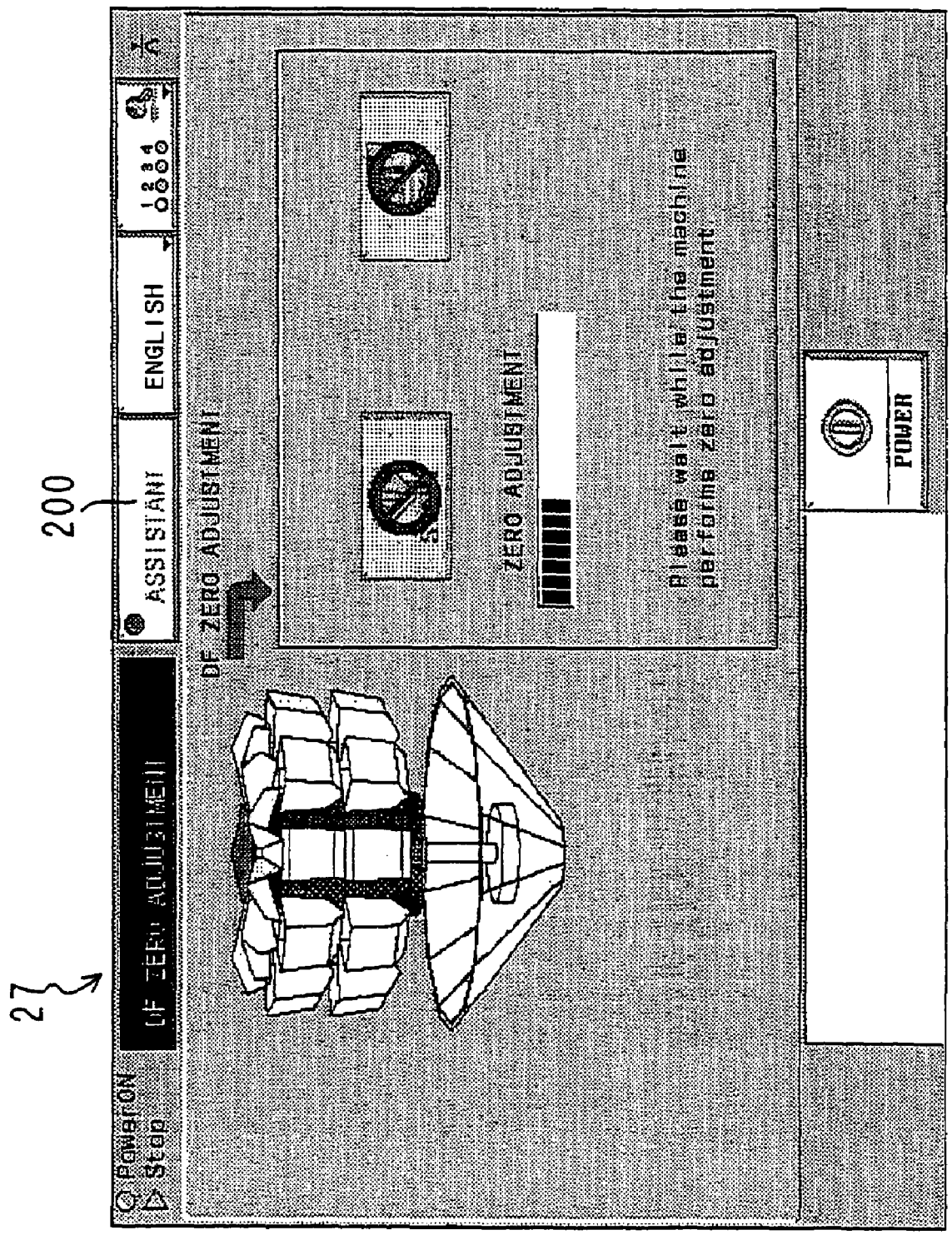
FIG. 20 is a diagram of the "DF ZERO ADJUSTMENT" screen that indicates that zero adjustment is in progress.
Figure 21:
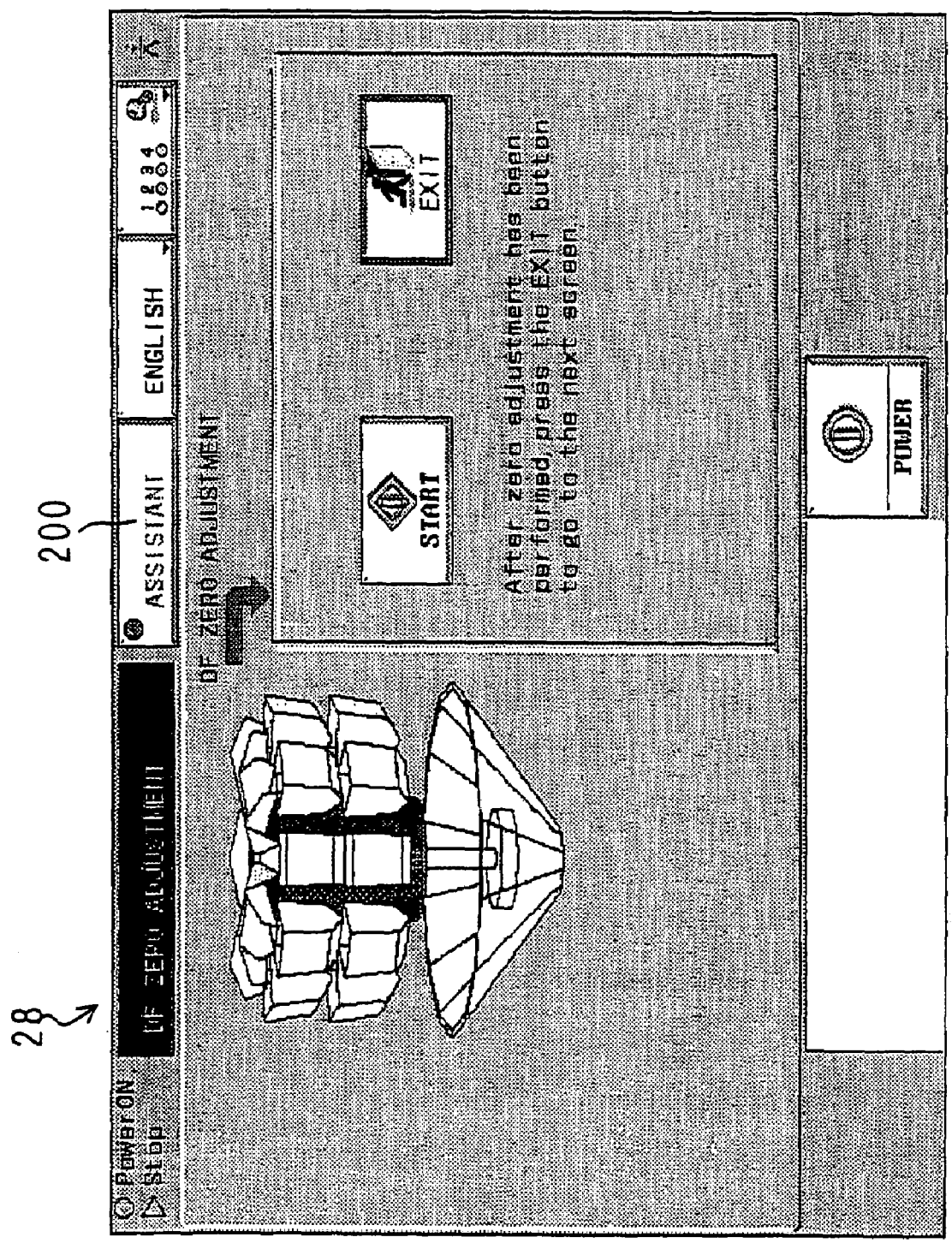
FIG. 21 is a diagram of the "DF ZERO ADJUSTMENT" screen that indicates that zero adjustment has finished.

If the "EXIT" button 260 is pressed, then "DF ZERO ADJUSTMENT" screens 26, 27, 28 shown in FIG. 19 through FIG. 21 are displayed. The "DF ZERO ADJUSTMENT" screens 26, 27, 28 provide guidance on zero adjusting the dispersion feeder 2.

First, the screen 26 shown in FIG. 19 displays a three-dimensional model 26a of the combinational weighing apparatus 1, a "START" button 270, and an "EXIT" button 271. A portion 26b corresponding to the dispersion feeder 2 of the three-dimensional model 26a of the combinational weighing apparatus 1 is colored to make it easy to discriminate it from other members. In addition, an explanation 26c is displayed that explains that the colored portion 26b is the dispersion feeder 2, and that indicates to press the "START" button 270 after checking no articles to be weighed on the dispersion feeder 2, which will thereby zero adjust the dispersion feeder 2, and if there are articles to be weighed on the dispersion feeder 2, then press the "EXIT" button 271 to proceed to the next screen. In addition, the "START" button 270 is displayed in flashing mode.

If the "START" button 270 is pressed, then the screen 27 that indicates that zero adjustment is in progress, and the screen 28 that indicates that zero adjustment is finished, are displayed successively, as shown in FIG. 20 and FIG. 21, the same as when zero adjusting the weigh hoppers 5.

Figure 22:
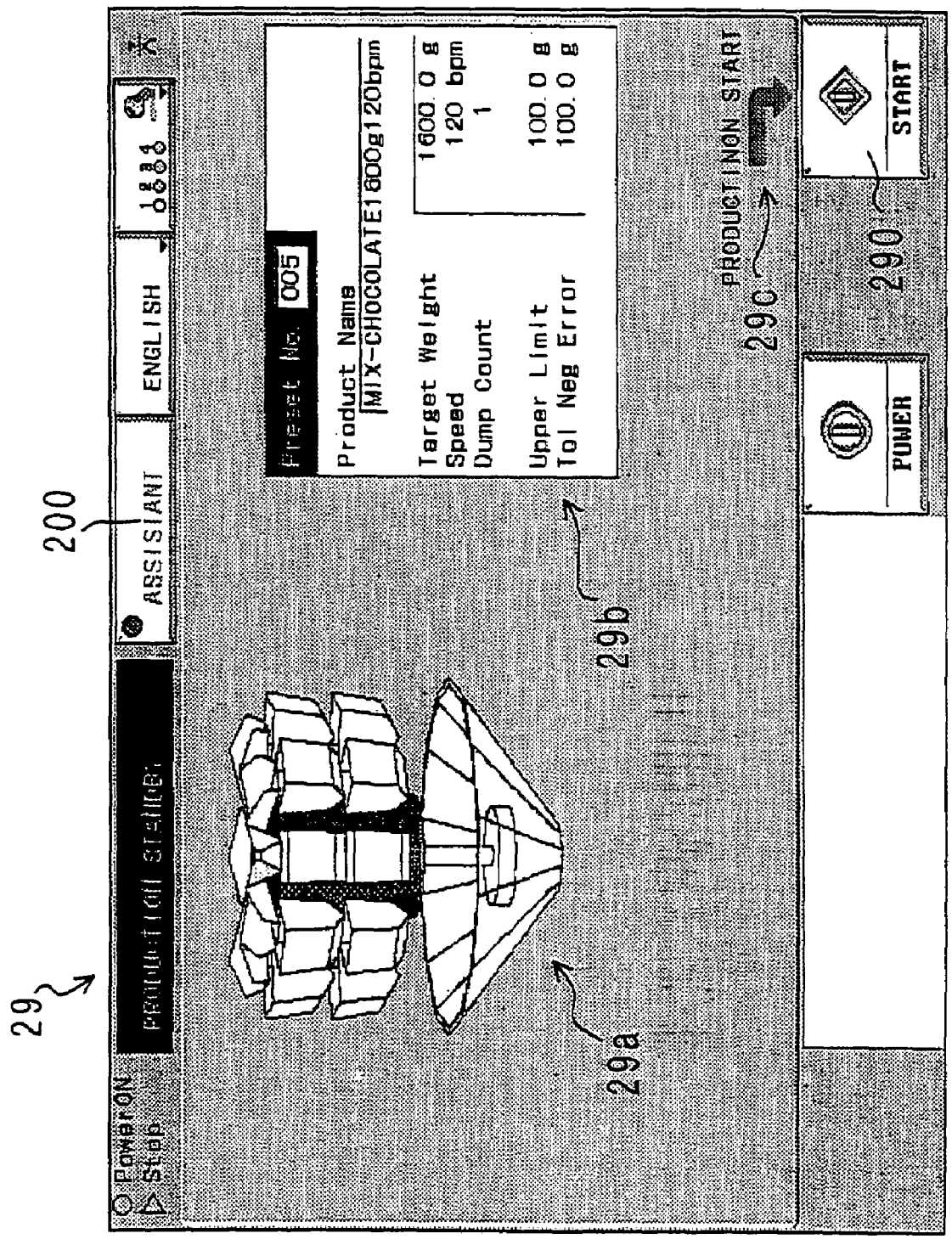
FIG. 22 is a diagram of the "PRODUCTION STANDBY" screen.

After the screen 28, which indicates completion of zero adjustment, is displayed, or if the "EXIT" button 271 in the screen 26 shown in FIG. 19 is pressed, then a "PRODUCTION STANDBY" screen 29 shown in FIG. 22 is displayed. The "PRODUCTION STANDBY" screen 29 provides guidance that preparations to weigh articles have been completed. This screen 29 displays a three-dimensional model 29a of the combinational weighing apparatus 1 and details 29b of the currently selected preset. In addition, a "START" button 290 and an arrow 29c that indicates that the "START" button 290 is to be pressed are displayed.

If the "START" button 290 is pressed, then the assistant function ends, and combinational weighing is started.

Further, the "ASSISTANT" screen displays the "ASSISTANT" button 200. If the "ASSISTANT" button is pressed, then the assistant function turns off, and processing proceeds to the "MAIN MENU" screen 10 even if the "ASSISTANT" screen is in progress.

Figure 23:
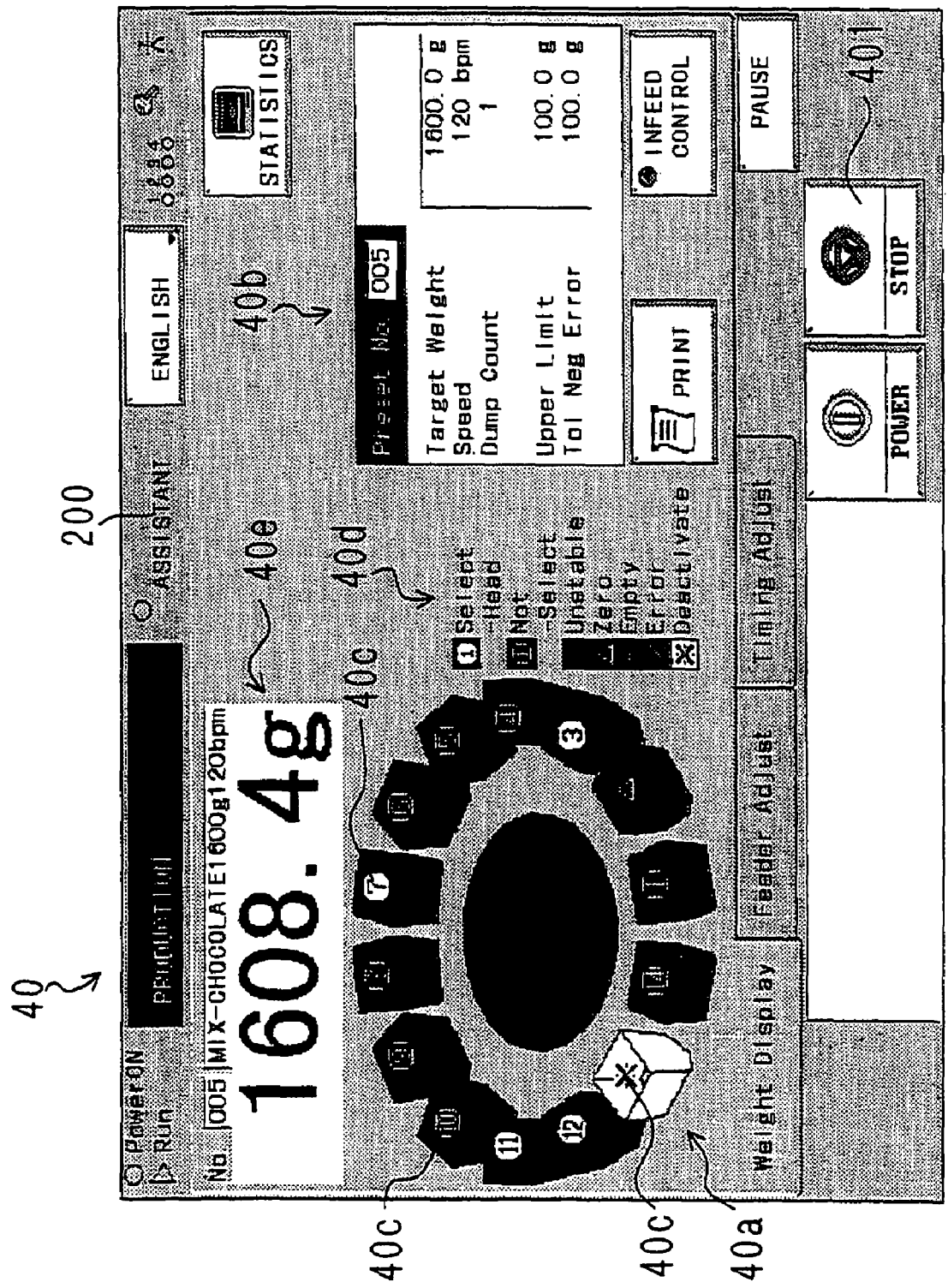
FIG. 23 is a diagram of the "PRODUCTION" screen.

If one of the "START" buttons 170, 290 in the "MAIN MENU" screen 10 or "PRODUCTION STANDBY" screen 29 is pressed, and combinational weighing is started, then the "PRODUCTION" screen 40 shown in FIG. 23 is displayed. This screen 40 displays a three-dimensional model 40a of the weigh hoppers 5 and details 40b of the currently selected preset. The three-dimensional model 40a of the weigh hoppers 5 is arranged circularly, the same as the actual weigh hoppers 5, and marks 40c are displayed respectively corresponding to the weigh hoppers 5 selected to participate in the combination, the weigh hoppers 5 not participating in the combination, and the empty weigh hoppers 5. In addition, a legend 40d that explains the state indicated by each mark is displayed to the side of the three-dimensional model 40a of the weigh hoppers 5. In addition, a total weight 40e of the articles to be weighed of the weigh hoppers 5 combinationally selected by the combination weighing is displayed. If a "STOP" button 401 displayed in the screen 40 is pressed, then the "MAIN MENU" screen 10 for the operator, discussed earlier, is displayed.

Furthermore, if the assistant function is on and the "MAIN MENU" screen 10 is left displayed without performing any operation for a fixed period of time, then the "WH ZERO ADJUSTMENT" screen 23 shown in FIG. 16 is automatically displayed, and guidance is provided to perform zero adjustment again.

Characteristics (1) In the present combinational weighing apparatus 1, the operator should perform operations in accordance with the procedure displayed in the "ASSISTANT" screen. Consequently, even an operator unfamiliar with the operation of the combinational weighing apparatus 1 can appropriately operate the combinational weighing apparatus 1. Among the users of the combinational weighing apparatus 1, operators that carry out the manufacturing of articles often do not have specialized knowledge about weighing apparatuses, and sometimes do not understand that it is necessary to perform zero adjustment before weighing in order to perform accurate weighing. In addition, even most operators who understand this operation sometimes forget to perform zero adjustment if the operator carrying out operations has limited experience in using a combinational weighing apparatus 1. In such a case, there is a risk that errors in the weight value could occur. In addition, operators sometimes misselect a preset or forget to select a preset. However, in the present combinational weighing apparatus 1, the operation procedure is guided by the "ASSISTANT" screen. In addition, unnecessary operation buttons are not displayed in the "ASSISTANT" screen, and necessary operation buttons are displayed in flashing mode, thus making the display easy to understand. Furthermore, the "ASSISTANT" screen also displays an explanation of the meaning of the displayed operation details, the results of any operations performed, and the like. Consequently, even an operator unfamiliar with the present combinational weighing apparatus 1 as discussed above can easily understand the operation details and the operation procedure, and can appropriately operate the combinational weighing apparatus 1.

(2) In the present combinational weighing apparatus 1, the combinational weighing apparatus 1 is displayed three-dimensionally in the "ASSISTANT" screen and other operation screens and, furthermore, the portion undergoing operation is colored. In addition, the operation of the combinational weighing apparatus 1 is displayed by animation. Consequently, the operator can confirm the actual operation of the combinational weighing apparatus 1 by the animation on the screen, and can therefore more easily understand the operation details. Thereby, even an operator unfamiliar with the combinational weighing apparatus 1 can appropriately operate the combinational weighing apparatus 1.

(3) The assistant function in the present combinational weighing apparatus 1 can be turned on and off by the "START-UP ASSISTANT" screen 20, the "ACCESS LEVEL" screen 30, and the "ASSISTANT" button 200. Although it is convenient that operation can be performed appropriately because the "ASSISTANT" screen provides guidance on the operation procedure, there are also cases in which the operator is familiar with the operation details of the combinational weighing apparatus 1, and does not need the guidance screens. In the present combinational weighing apparatus 1, the assistant function should be turned off if the "ASSISTANT" screen is not needed, and the assistant function should be turned on if the "ASSISTANT" screen is needed. Consequently, for an operator who can appropriately perform operation even without the "ASSISTANT" screen, the "ASSISTANT" screen is omitted, and operation proceeds directly from the "MAIN MENU" screen 10, thus enabling efficient operation of the combinational weighing apparatus 1.

In particular, if a button other than the "OPERATOR" button 201 in the "ACCESS LEVEL" screen 30 shown in FIG. 9 is pressed, then processing does not proceed to the "ASSISTANT" screen. For operators, who are not considered to have a very high operation level, the "ASSISTANT" screen is displayed after displaying the "START-UP ASSISTANT" screen 20, wherein the necessity of the "ASSISTANT" screen is selected, and the "ASSISTANT" screen is not displayed at other levels, which are regarded to have a high operation level. In other words, in the present combinational weighing apparatus 1, if a user presses a button in the "ACCESS LEVEL" screen 30 relevant to oneself, then the "ASSISTANT" screen is displayed based on whether or not to display the "ASSISTANT" screen corresponding to the user's level stored in the memory 80. Thereby, the combinational weighing apparatus 1 can be efficiently operated in accordance with the operation level of the user.

Other Embodiments

In the abovementioned embodiment, the present invention is employed in the combinational weighing apparatus 1, but may be employed in other article manufacturing apparatuses. For example, the present invention may be adopted in a packaging apparatus that packages articles by wrapping them with film. In other words, it would be acceptable to display on a touch screen of a packaging apparatus an "ASSISTANT" screen that provides procedural guidance on the operation details of the packaging apparatus, such as the procedure for setting the film or the procedure for the packaging operation, and to display a three-dimensional model of the packaging apparatus on the touch screen; likewise for quality inspection equipment, e.g., a weight checker, a metal detector, and an X-ray inspection device, which inspect the quality of finished articles, as well as case packing machines that pack finished articles in boxes, and the like.

INDUSTRIAL APPLICABILITY

By using the article manufacturing apparatus according to the present invention, the display unit displays a guidance screen that provides procedural guidance on the operation details of the article manufacturing apparatus and, consequently, even an inexperienced user can perform appropriate operation.

The invention claimed is:

1. An article manufacturing apparatus disposed in an article manufacturing line, comprising:
   an article manufacturing unit for manufacturing articles;
   a display unit that displays an operation screen indicating operation details of said article manufacturing unit, and a guidance screen providing procedural guidance on said operation details; and
   an operation unit that is operatively connected to said article manufacturing unit and is configured to allow said guidance screen to be selectively displayed and turned off on said display unit upon request by an operator operating a designated button at any time after the operation of said article manufacturing apparatus has begun, said operation details of said article manufacturing unit being configured to be inputted at said operation unit, said operation unit being configured to control the operation of said article manufacturing unit based on said inputted operation details.

2. The article manufacturing apparatus according to claim 1, wherein
   said display unit three-dimensionally displays said article manufacturing apparatus at least partially in said operation screen or said guidance screen.

3. The article manufacturing apparatus according to claim 1, wherein
said display unit displays an animation of the operation of said article manufacturing apparatus at least partially in said operation screen or said guidance screen.

4. The article manufacturing apparatus according to claim 1, further comprising:
selecting means that selects whether to display said guidance screen.

5. The article manufacturing apparatus according to claim 4, further comprising:
storage means that stores operation level of an operator who operates said article manufacturing apparatus, and whether to display said guidance screen based on said operation level of the operator; wherein,
said selecting means displays said guidance screen if said storage means indicates that said guidance screen should be displayed for the operator.

6. The article manufacturing apparatus according to claim 1, wherein
said display unit includes a touch screen where an operator can input operation details.

7. The article manufacturing apparatus according to claim 1, wherein
said article manufacturing unit includes
a dispersion feeder that receives supply of articles to be weighed,
a plurality of pool hoppers arranged below said dispersion feeder and disposed circumferentially,
a plurality of weigh hoppers arranged below said pool hoppers and disposed circumferentially, and
a load cell that weighs articles held in each of said weigh hoppers, and
said operation unit controls combinational weighing of the articles held in said weigh hoppers.

* * * * *